(12) United States Patent
Kikuta

(10) Patent No.: US 9,208,417 B2
(45) Date of Patent: Dec. 8, 2015

(54) IMAGE PROCESSING APPARATUS, RECORDING METHOD, AND STORAGE MEDIUM FOR OUTPUTTING IMAGE DATA EXPRESSING HALFTONE DOTS

(71) Applicant: CANON KABUSHIKI KAISHA, Tokyo (JP)

(72) Inventor: Kyohei Kikuta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/325,135

(22) Filed: Jul. 7, 2014

(65) Prior Publication Data

US 2015/0015915 A1    Jan. 15, 2015

(30) Foreign Application Priority Data

Jul. 9, 2013  (JP) ................................. 2013-143698

(51) Int. Cl.
*H04N 1/60* (2006.01)
*G06K 15/02* (2006.01)
*H04N 1/52* (2006.01)

(52) U.S. Cl.
CPC .............. *G06K 15/1881* (2013.01); *H04N 1/52* (2013.01); *H04N 1/6027* (2013.01)

(58) Field of Classification Search
None
See application file for complete search history.

(56) References Cited

U.S. PATENT DOCUMENTS

| | | | | |
|---|---|---|---|---|
| 6,717,601 | B2 * | 4/2004 | Sanger | 347/115 |
| 6,967,747 | B2 * | 11/2005 | Housel | 358/1.9 |
| 7,245,400 | B2 * | 7/2007 | Schuppan | 358/3.2 |
| 7,460,272 | B2 * | 12/2008 | Hara | 358/1.9 |

FOREIGN PATENT DOCUMENTS

JP          2004-511184 A       4/2004

* cited by examiner

*Primary Examiner* — Paul F Payer
(74) *Attorney, Agent, or Firm* — Canon USA Inc. IP Division

(57) ABSTRACT

An image processing apparatus configured to generate print data used for recording image data expressing halftone dots by an image forming apparatus includes an input unit configured to input image data expressing halftone dots, an obtaining unit configured to obtain color tone information indicating color tone for each pixel or for each area including a plurality of pixels in the image data, a conversion unit configured to perform multivalue conversion of the image data based on a degree of smoothing according to the color tone information, a color separation processing unit configured to perform color separation on the image data which has been multi-valued by the conversion unit, and a halftone processing unit configured to convert image data which has been color-separated by the color separation processing unit into print data.

16 Claims, 20 Drawing Sheets

FIG.6A

| 0.00 | 0.00 | 0.00 | 0.00 | 0.00 | 0.00 | 0.00 | 0.00 | 0.00 | 0.00 | 0.00 |
|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.01 | 0.02 | 0.01 | 0.00 | 0.00 | 0.00 | 0.00 |
| 0.00 | 0.00 | 0.00 | 0.01 | 0.06 | 0.10 | 0.06 | 0.01 | 0.00 | 0.00 | 0.00 |
| 0.00 | 0.00 | 0.00 | 0.02 | 0.10 | 0.16 | 0.10 | 0.02 | 0.00 | 0.00 | 0.00 |
| 0.00 | 0.00 | 0.00 | 0.01 | 0.06 | 0.10 | 0.06 | 0.01 | 0.00 | 0.00 | 0.00 |
| 0.00 | 0.00 | 0.00 | 0.00 | 0.01 | 0.02 | 0.01 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |

FIG.6B

| 0.00 | 0.00 | 0.00 | 0.00 | 0.00 | 0.00 | 0.00 | 0.00 | 0.00 | 0.00 | 0.00 |
|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.01 | 0.01 | 0.01 | 0.00 | 0.00 | 0.00 | 0.00 |
| 0.00 | 0.00 | 0.00 | 0.01 | 0.02 | 0.03 | 0.02 | 0.01 | 0.00 | 0.00 | 0.00 |
| 0.00 | 0.00 | 0.01 | 0.02 | 0.05 | 0.06 | 0.05 | 0.02 | 0.01 | 0.00 | 0.00 |
| 0.00 | 0.00 | 0.01 | 0.03 | 0.06 | 0.08 | 0.06 | 0.03 | 0.01 | 0.00 | 0.00 |
| 0.00 | 0.00 | 0.01 | 0.02 | 0.05 | 0.06 | 0.05 | 0.02 | 0.01 | 0.00 | 0.00 |
| 0.00 | 0.00 | 0.00 | 0.01 | 0.02 | 0.03 | 0.02 | 0.01 | 0.00 | 0.00 | 0.00 |
| 0.00 | 0.00 | 0.00 | 0.00 | 0.01 | 0.01 | 0.01 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |

FIG.6C

| 0.00 | 0.00 | 0.00 | 0.00 | 0.00 | 0.00 | 0.00 | 0.00 | 0.00 | 0.00 | 0.00 |
|---|---|---|---|---|---|---|---|---|---|---|
| 0.00 | 0.00 | 0.00 | 0.01 | 0.01 | 0.01 | 0.01 | 0.01 | 0.00 | 0.00 | 0.00 |
| 0.00 | 0.00 | 0.01 | 0.01 | 0.01 | 0.01 | 0.01 | 0.01 | 0.01 | 0.00 | 0.00 |
| 0.00 | 0.01 | 0.01 | 0.01 | 0.02 | 0.02 | 0.02 | 0.01 | 0.01 | 0.01 | 0.00 |
| 0.00 | 0.01 | 0.01 | 0.02 | 0.02 | 0.02 | 0.02 | 0.02 | 0.01 | 0.01 | 0.00 |
| 0.00 | 0.01 | 0.01 | 0.02 | 0.02 | 0.03 | 0.02 | 0.02 | 0.01 | 0.01 | 0.00 |
| 0.00 | 0.01 | 0.01 | 0.02 | 0.02 | 0.02 | 0.02 | 0.02 | 0.01 | 0.01 | 0.00 |
| 0.00 | 0.01 | 0.01 | 0.01 | 0.02 | 0.02 | 0.02 | 0.01 | 0.01 | 0.01 | 0.00 |
| 0.00 | 0.00 | 0.01 | 0.01 | 0.01 | 0.01 | 0.01 | 0.01 | 0.01 | 0.00 | 0.00 |
| 0.00 | 0.00 | 0.00 | 0.01 | 0.01 | 0.01 | 0.01 | 0.01 | 0.00 | 0.00 | 0.00 |
| 0.00 | 0.00 | 0.00 | 0.00 | 0.00 | 0.00 | 0.00 | 0.00 | 0.00 | 0.00 | 0.00 |

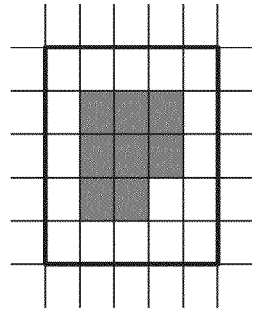

DEGREE OF BLUR DUE TO SMOOTHING FILTER: HIGH

DEGREE OF BLUR DUE TO SMOOTHING FILTER: MEDIUM

DEGREE OF BLUR DUE TO SMOOTHING FILTER: LOW

FIG.13A

| 0.00 | 0.00 | 0.00 | 0.00 | 0.00 | 0.00 | 0.00 | 0.00 | 0.00 | 0.00 | 0.00 |
|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.01 | 0.01 | 0.01 | 0.00 | 0.00 | 0.00 | 0.00 |
| 0.00 | 0.00 | 0.00 | 0.01 | 0.02 | 0.03 | 0.02 | 0.01 | 0.00 | 0.00 | 0.00 |
| 0.00 | 0.00 | 0.01 | 0.02 | 0.05 | 0.06 | 0.05 | 0.02 | 0.01 | 0.00 | 0.00 |
| 0.00 | 0.00 | 0.01 | 0.03 | 0.06 | 0.08 | 0.06 | 0.03 | 0.01 | 0.00 | 0.00 |
| 0.00 | 0.00 | 0.01 | 0.02 | 0.05 | 0.06 | 0.05 | 0.02 | 0.01 | 0.00 | 0.00 |
| 0.00 | 0.00 | 0.00 | 0.01 | 0.02 | 0.03 | 0.02 | 0.01 | 0.00 | 0.00 | 0.00 |
| 0.00 | 0.00 | 0.00 | 0.00 | 0.01 | 0.01 | 0.01 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 |

FIG.13B

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 1/25 | 1/25 | 1/25 | 1/25 | 1/25 | 0 | 0 | 0 |
| 0 | 0 | 0 | 1/25 | 1/25 | 1/25 | 1/25 | 1/25 | 0 | 0 | 0 |
| 0 | 0 | 0 | 1/25 | 1/25 | 1/25 | 1/25 | 1/25 | 0 | 0 | 0 |
| 0 | 0 | 0 | 1/25 | 1/25 | 1/25 | 1/25 | 1/25 | 0 | 0 | 0 |
| 0 | 0 | 0 | 1/25 | 1/25 | 1/25 | 1/25 | 1/25 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

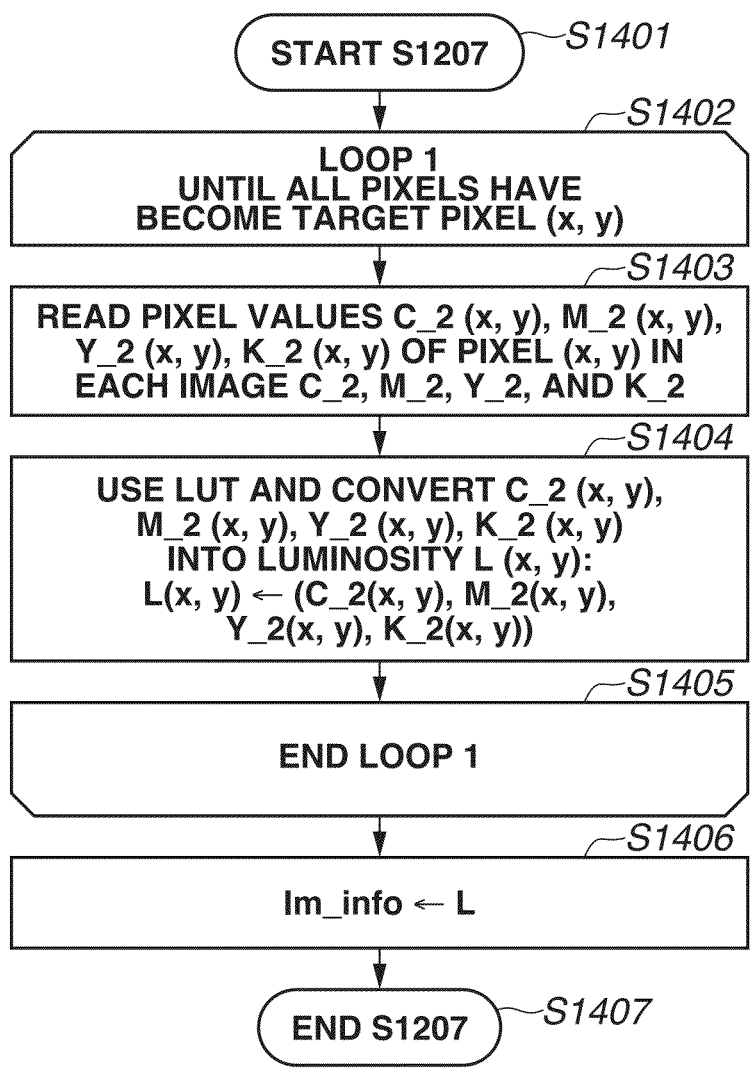

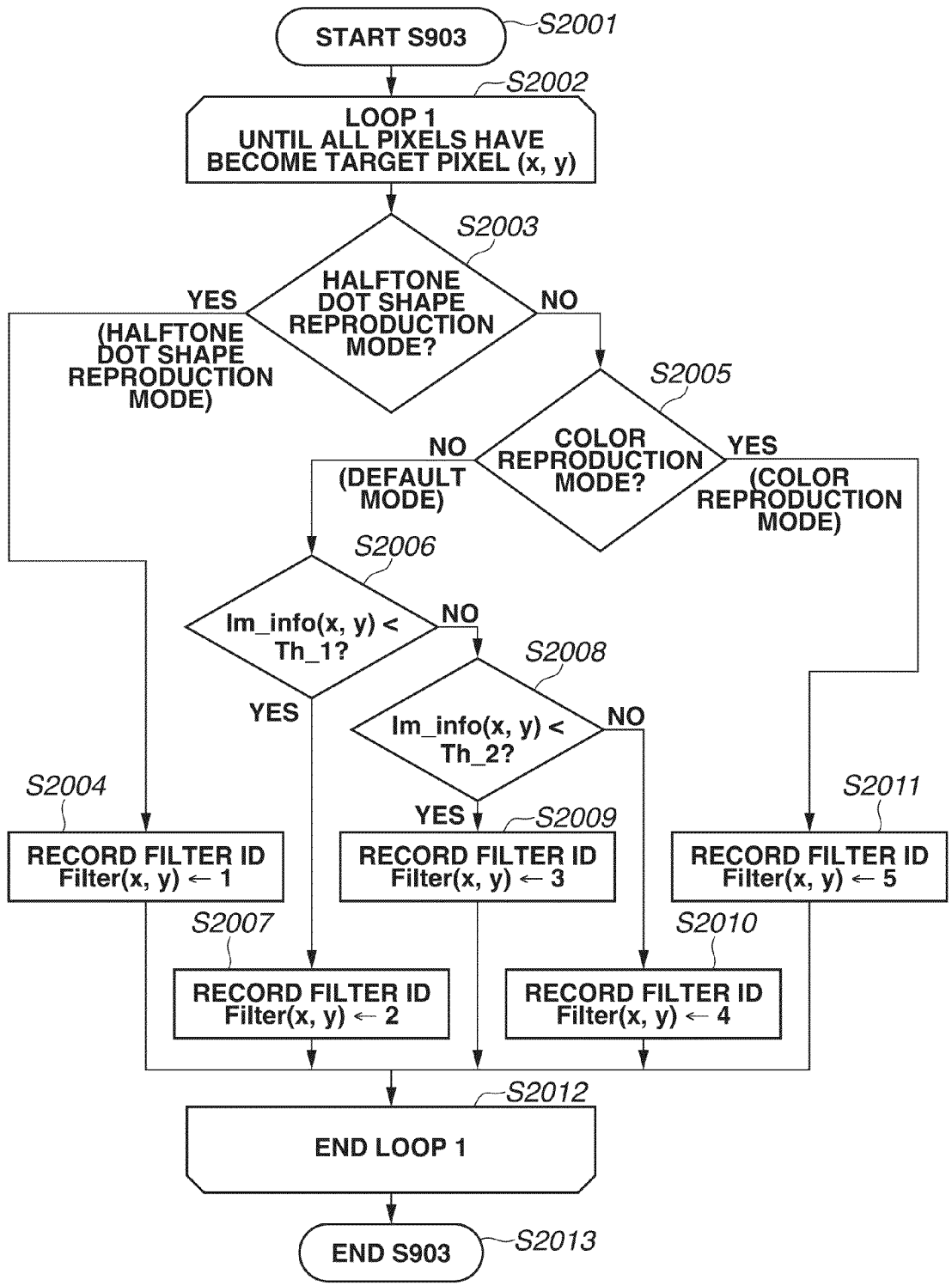

IMAGE PROCESSING APPARATUS, RECORDING METHOD, AND STORAGE MEDIUM FOR OUTPUTTING IMAGE DATA EXPRESSING HALFTONE DOTS

BACKGROUND OF THE INVENTION

1. Field of the Invention

The present disclosure generally relates to image processing and, more particularly, to an image processing apparatus, storage medium, and method performed for outputting image data expressing halftone dots using an image forming apparatus.

2. Description of the Related Art

An offset printing method is a representative example of a printing technique which requires a plate-making process. Generally, in offset printing, proofing is performed to confirm a pattern, color tone, and text before performing the plate-making process to reduce plate-making cost. An image forming apparatus employing an inkjet method is often used as a prepress apparatus for performing proofing. More specifically, such an image forming apparatus forms an image by recording dots and thus does not require performing the plate-making process. However, image forming processes, color materials, and characteristics of the offset printing and the image forming apparatus employing the dot recording method are different. As a result, if the same image data is printed using offset printing and the image forming apparatus employing the dot recording method, the color tone and a dot layout become different between the printed images.

To solve such a problem, there is a technique for the image forming apparatus employing the dot recording method to faithfully reproduce the same image output by offset printing. More specifically, Japanese Unexamined Patent Application Publication (Translation of PCT Application) No. 2004-511184 discusses a method for performing multivalue conversion by applying a smoothing filter on a halftone dot image to be used in offset printing. By applying the smoothing filter, multivalue color tone information, which is expressed approximately as the halftone dot image to be printed by offset-printing, is obtained, and image processing considering usage of the image forming apparatus employing the dot recording method is performed.

However, when proofing is performed on the halftone dot image, reproduction of a halftone dot shape is necessary in addition to reproduction of the color tone. In particular, when offset printing is performed by overlapping the halftone dot images corresponding to a plurality of colors, it is desirable to reproduce moiré, such as a rosette pattern generated by overlapping the halftone dot images of each color, in the proofing. According to the method discussed in Japanese Unexamined Patent Application Publication (Translation of PCT Application) No. 2004-511184, the smoothing filter performs multi-value conversion for reproducing the color tone, so that the halftone dot shape becomes blurred. Reproducibility of the halftone dot shape thus becomes low.

SUMMARY OF THE INVENTION

The present disclosure is directed to an image processing apparatus employing a dot recording method capable of outputting a halftone image with higher reproducibility, and an image processing method.

According to an aspect of the present disclosure, an image processing apparatus configured to generate print data used for recording image data expressing halftone dots by an image forming apparatus includes an input unit configured to input image data expressing halftone dots, an obtaining unit configured to obtain color tone information indicating color tone for each pixel or for each area including a plurality of pixels in the image data, a conversion unit configured to perform multivalue conversion of the image data based on a degree of smoothing according to the color tone information, a color separation processing unit configured to perform color separation on the image data which has been multi-valued by the conversion unit, and a conversion unit configured to convert image data which has been color-separated by the color separation processing unit into print data.

Further features of the present disclosure will become apparent from the following description of exemplary embodiments with reference to the attached drawings.

BRIEF DESCRIPTION OF THE DRAWINGS

FIGS. 6A, 6B, and 6C illustrate examples of a filter.

FIGS. 7A, 7B, 7C, and 7D illustrate the halftone dot image data and multivalue conversion.

FIGS. 13A and 13B illustrate filters.

FIG. 14 is a flowchart illustrating a color tone information calculation process.

FIG. 20 is a flowchart illustrating a filter determination process.

DESCRIPTION OF THE EMBODIMENTS

Various exemplary embodiments, features, and aspects of the disclosure will be described in detail below with reference to the drawings. The configurations illustrated in the following exemplary embodiments are merely examples, and the present disclosure is not limited thereto.

Figure 1:
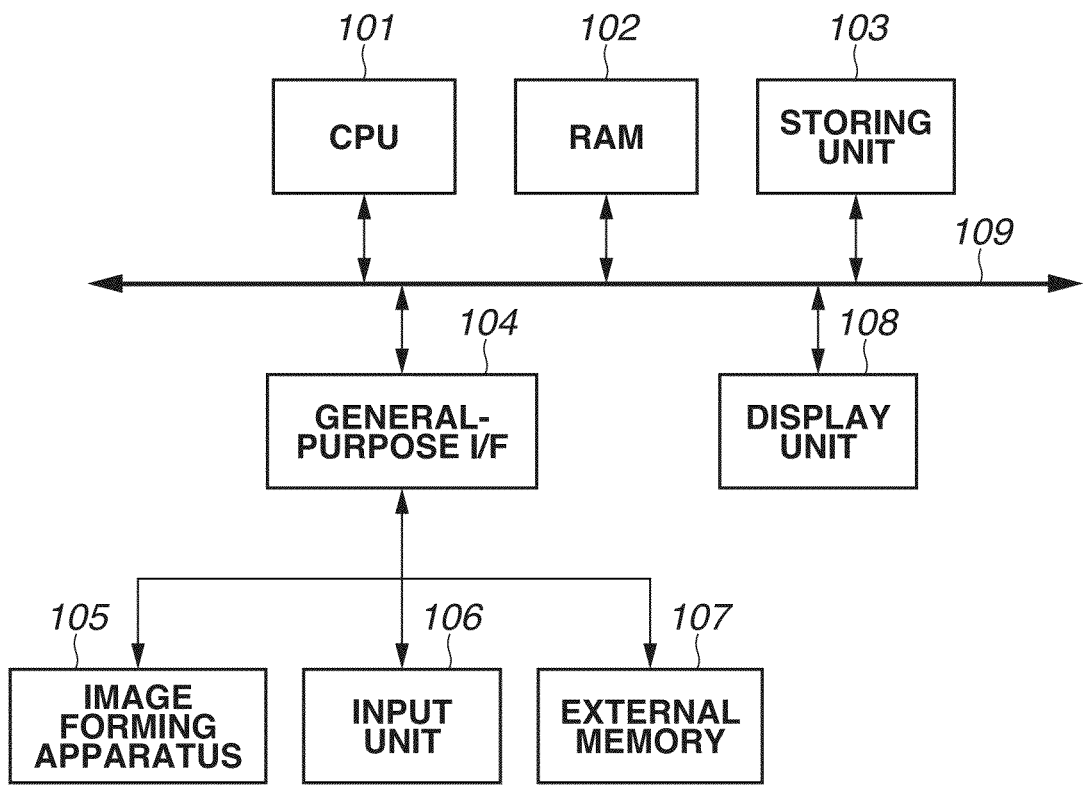
FIG. 1 is a block diagram schematically illustrating a hardware configuration of an image processing apparatus.

FIG. 1 illustrates a hardware configuration of an image processing apparatus applicable to the present exemplary embodiment. For example, the image processing apparatus is realized as a printer driver installed in a general personal computer (PC). Referring to FIG. 1, an image processing apparatus 201 includes a central processing unit (CPU) 101, a random access memory (RAM) 102, a storing unit 103, a general-purpose interface (I/F) 104, a display unit 108, and a main bus 109. The display unit 108, such as a monitor or a display device, displays the image data and a user interface (UI) which can be operated by a user. An input unit 106, realized by a mouse or a keyboard, receives an operation input by the user. The general-purpose I/F 104 connects an image forming apparatus 105, the input unit 106, and an external memory 107, such as a memory card, to the main bus 109. As used herein, the term "unit" generally refers to any combination of software, firmware, hardware, or other component that is used to effectuate a purpose.

The CPU 101 activates an image processing application stored in the storing unit 103, and loads the application in the RAM 102. The data necessary for performing image processing, such as various data stored in the storing unit 103 and the external memory 108, and an instruction from the input unit 106, are then transferred to the RAM 102. Further, various processes based on the instruction from the CPU 101 are performed on the data stored in the RAM 102 according to the processes included in the image processing application. A calculation result is displayed on the display unit 108 or stored in the storing unit 103 and the external memory 107.

The various types of image processing realized by the CPU 101 activating various kinds of software (i.e., computer programs) stored in the storing unit 103 will be described below. According to the present exemplary embodiment, the various types of image processing performed by the CPU 101 includes image reading, obtaining of color tone information, multivalue conversion, color separation processing, halftone processing, and halftone image data storing and outputting.

Figure 2:
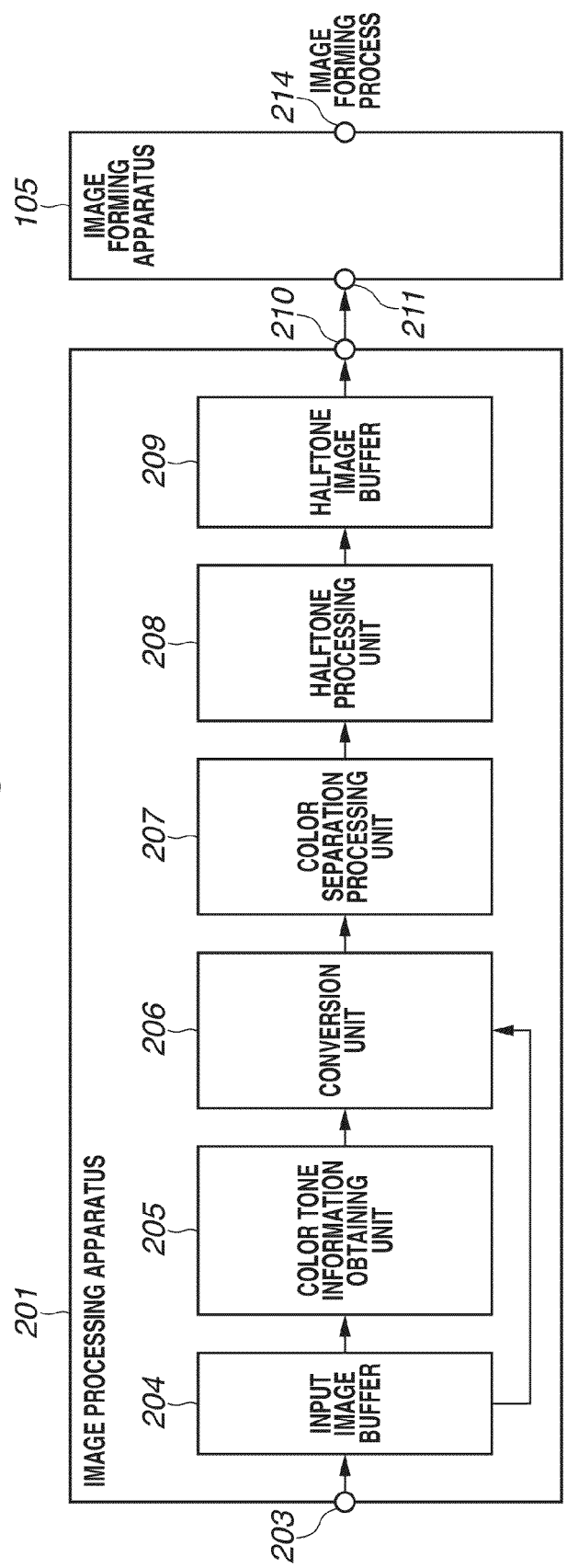
FIG. 2 is a block diagram illustrating a logical configuration of the image processing apparatus.

FIG. 2 is a block diagram illustrating a logical configuration of the image processing apparatus executed by the CPU 101. Referring to FIG. 2, the image processing apparatus 201 includes an input image buffer 204, a color tone information obtaining unit 205, a conversion unit 206, a color separation processing unit 207, a halftone processing unit 208, and a halftone image buffer 209.

Figure 3:
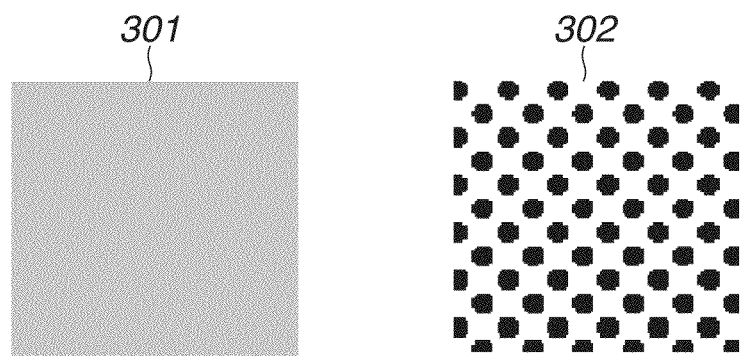
FIG. 3 illustrates an example of halftone dot image data.

The CPU 101 reads the halftone dot image data input from an input terminal 203, and stores the halftone dot image data in the input image buffer 204. FIG. 3 illustrates the halftone dot image data. Referring to FIG. 3, an image 301 is original image data (hereinafter also referred to as an original image) to be printed by the offset printing apparatus. Since the image 301 is multivalue image data, the image 301 is converted to an amplitude-modulated (AM) screen, and halftone dot image data 302 is obtained. The offset printing apparatus can thus output the image 301. The halftone dot image data is expressed as a binary image (of 1 bit) indicating on/off of the dots of each color component. In such a case, the halftone dot image data 302 expresses, in a pseudo manner, gradation indicated by the image 301 by a size of the dot (i.e., halftone dot) for each cell. The image processing apparatus 201 receives the halftone dot image data output from the offset printing apparatus to reproduce a print output. The offset printing apparatus which is to reproduce the print output includes four color materials, i.e., cyan (C), magenta (M), yellow (Y), and black (K). The halftone dot image data corresponding to each of C, M, Y, and K is thus input to the image processing apparatus 201.

The color tone information obtaining unit 205 obtains the color tone information expressed by the halftone dot image of the binary halftone image data stored in the input image buffer 204. As described above, the halftone dot image data is the image data converted to express, in a pseudo manner, the color tone indicated by the original image for each predetermined area. The color tone information indicated by the halftone dot image is approximated to the color tone of the original image data. According to the present exemplary embodiment, a case where the color tone information obtaining unit 205 is capable of referring to the original image data is thus considered, and each pixel value of the original image data is obtained as the color tone information indicated by the halftone dot image. Each pixel value of the original image data is a value indicating brightness of the corresponding color component. In other words, according to the present exemplary embodiment, a mean pixel value of each pixel in the original image data is assumed to indicate brightness and is used as the color tone information. The color tone information obtaining unit 205 outputs the color tone information to the conversion unit 206.

The conversion unit 206 performs smoothing by using the smoothing filter with respect to the halftone dot image data corresponding to each color, and thus performs multivalue conversion on the halftone dot image data. More specifically, the conversion unit 206 converts the image data of each color stored in the input image buffer 104 to a multi-value format (i.e., 8 bits). The conversion unit 206 then performs smoothing by using the smoothing filter and calculates multi-valued image data. The conversion unit 206 sets the filter of a degree of smoothing according to the color tone information received from the color tone information obtaining unit 205, for each pixel.

The color separation processing unit 207 performs color separation processing on the multi-valued image data for each color obtained from the conversion unit 206, to obtain the image data corresponding to the color material included in the image forming apparatus. The color separation processing unit 207 refers to a color separation look-up table (LUT, not illustrated), and performs color separation. According to the present exemplary embodiment, the colors of the color materials included in the image forming apparatus 105 are the four colors, i.e., C, M, Y, and K. However, the color materials in the image forming apparatus 105 are different from the C, M, Y, and K color materials included in the above-described offset printing apparatus. The color separation processing unit 207 converts the four multi-valued image data to a data set of four color-separated image data. The color-separated image data for each color is 8-bit data.

The halftone processing unit 208 performs halftone processing on the color-separated image data obtained from the color separation processing unit 207, and outputs the print data of a gradation number printable by the image forming apparatus 105. More specifically, the halftone processing unit 208 converts the 8-bit color-separated image data to 1-bit (i.e., binary) halftone image data. According to the present exemplary embodiment, an error diffusion method is used in performing halftone processing. The halftone processing unit 208 outputs the halftone image data corresponding to each of C, M, Y, and K to the halftone image buffer 209. The stored halftone image data is output from an output terminal 210 to the image forming apparatus 105.

The image forming apparatus 105 is configured of hardware and is connected to the image processing apparatus 201 via a printer interface or a circuit. According to the present exemplary embodiment, the image forming apparatus 105 is an inkjet printer. The image forming apparatus 105 receives the print data output from the CPU 101 and forms the image on a recording medium by employing the inkjet method. According to the present exemplary embodiment, the image forming apparatus 105 performs multi-pass recording. In other words, the image forming apparatus 105 relatively record-scans a recording head in vertical and horizontal directions with respect to the recording medium and thus forms the image. The recording head includes one or more recording elements (i.e., nozzles) corresponding to C, M, Y, and K. The image forming apparatus 105 generates a drive signal for controlling the recording head based on the halftone image data received from the image processing apparatus 201. The recording head thus records the image on the recording medium according to a recording signal.

Figure 4:
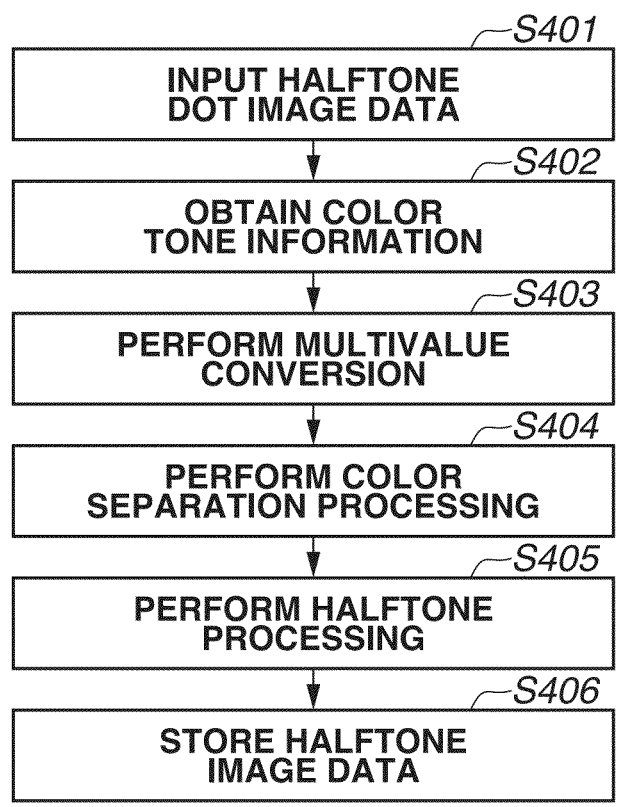
FIG. 4 is a flowchart illustrating image processing performed in the image processing apparatus.

FIG. 4 is a flowchart illustrating a process of the image processing apparatus 201 executed by the CPU 101. In step S401, the CPU 101 receives the halftone dot image data, and stores the halftone dot image data in the input image buffer 204. Each of the halftone dot image data corresponding to C, M, Y, and K, i.e., C_in, M_in, Y_in, and K_in, is 1-bit data in which the pixel value of 1 or 0 is stored in each pixel. According to the present exemplary embodiment, 0 indicates an on dot, and 1 indicates an off dot.

In step S402, the color tone information obtaining unit 205 obtains color information Im_info indicating the color tone expressed by each pixel in each of the halftone dot image data. According to the present exemplary embodiment, each pixel value in the original image data which the halftone image data is based on is used as the color tone information of each pixel in the halftone dot image data. The original image data has pixel values from 0 to 255 corresponding to the number of channels for each pixel. According to the present exemplary embodiment, the pixel in the original image data has the pixel value (255, 255, 255, 255) with respect to the 4 channels corresponding to C, M, Y, and K. In each channel, the pixel value 0 indicates that the brightness is low, and the pixel value 255 indicates that the brightness is high.

In step S403, the conversion unit 206 performs multivalue conversion on the halftone dot image data for each color using the smoothing filter. More specifically, the conversion unit 206 converts the halftone dot image data to the 8-bit format before performing multivalue conversion using the smoothing filter. The conversion unit 206 then performs filtering by using the smoothing filter on the halftone dot image data converted to the 8-bit format and thus performs multivalue conversion. The conversion unit 206 selects the smoothing filter according to the color tone information obtained by the color tone information obtaining unit 205. The filter selection process will be described in detail below. As a result, the halftone dot image data corresponding to each color is converted to the 8-bit multi-valued image data (C_1, M_1, Y_1, K_1).

In step S404, the color separation processing unit 207 performs color separation processing corresponding to the image forming apparatus 105 on the C, M, Y, and K multi-valued image data (C_1, M_1, Y_1, K_1), and converts it to color-separated image data (C_m, M_m, Y_m, K_m). If the image forming apparatus 105 includes a larger number of color materials, the color separation processing unit 207 performs color separation processing for the number of the colors. For example, if the image forming apparatus 105 includes light cyan (lc) and light magenta (lm) in addition to C, M, Y, and K, the color separation processing unit 207 converts the multi-valued image data (C_1, M_1, Y_1, K_1) to the color-separated image data (C_m, M_m, Y_m, K_m, lc_m, lm_m), i.e., performs 4-to-6 data set conversion.

In step S405, the halftone processing unit 208 employs the error diffusion method and performs halftone processing on the color-separated image data (C_m, M_m, Y_m, K_m) corresponding to each color. As a result, the halftone processing unit 208 generates the 1-bit (binary) halftone image data.

In step S406, the halftone processing unit 208 stores the generated halftone image data for each color in the halftone image buffer 209, and the process ends.

Figure 5:
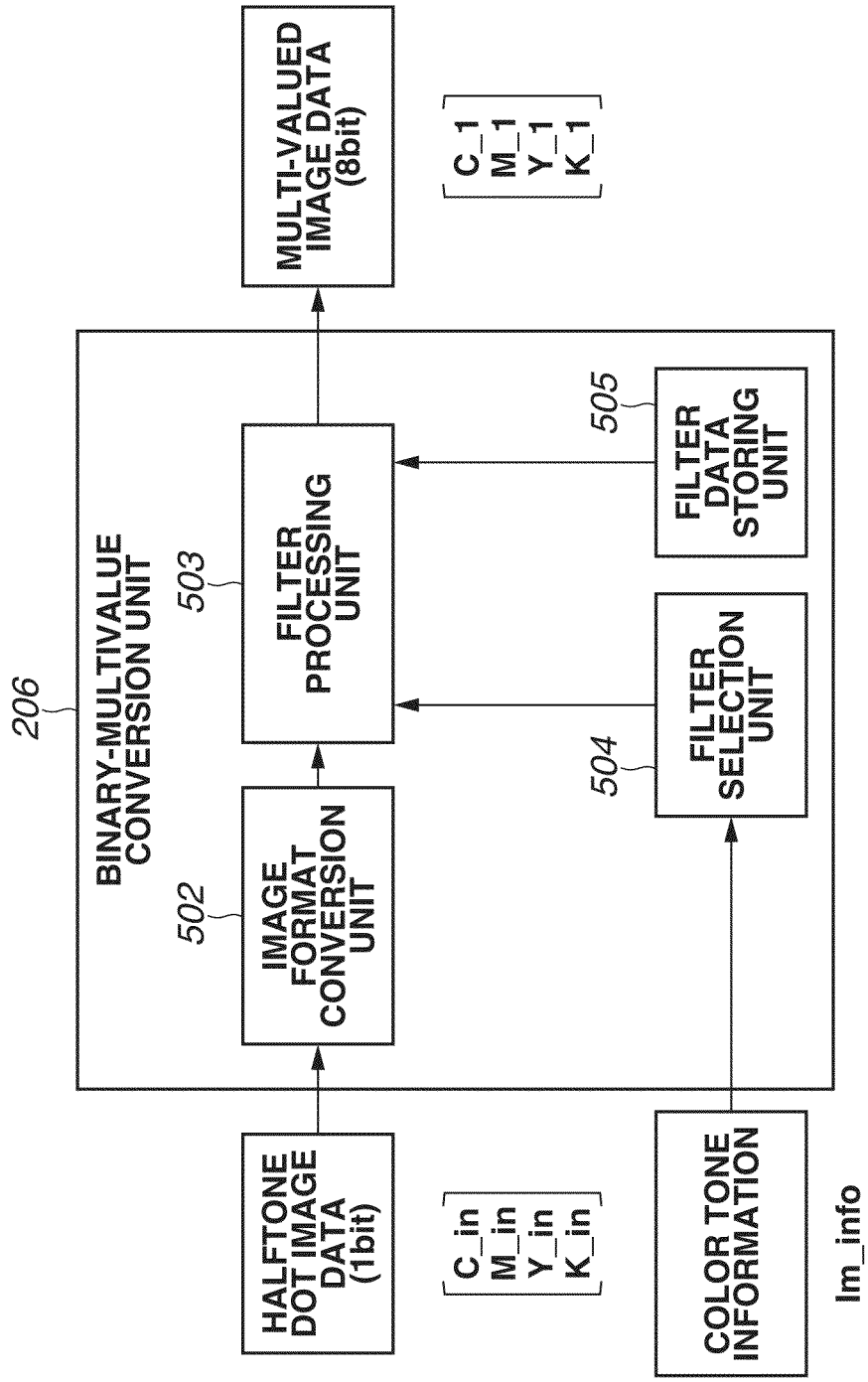
FIG. 5 illustrates a logical configuration of a conversion unit.

The conversion unit 206 will be described in detail below. FIG. 5 is a block diagram illustrating a detailed logical configuration of the conversion unit 206. Referring to FIG. 5, the conversion unit 206 includes an image format conversion unit 502, a filter processing unit 503, a filter selection unit 504, and a filter data storing unit 505.

The filter data storing unit 505 stores a plurality of smoothing filters. According to the present exemplary embodiment, the filter data storing unit 505 includes three smoothing filters. The size and resolution of the filter is determined by the resolution of the halftone dot image data, number of lines per inch of the halftone dots, and the resolution of the image forming apparatus 105. For example, the size of the cell forming the halftone dot is set as a filter size, and a filter coefficient is set. According to the present exemplary embodiment, the halftone dot image data has 175 lines per inch, and the resolution is 2400×2400 dpi. The degree of smoothing is different for each of the three filters stored in the filter data storing unit 505. FIGS. 6A, 6B, and 6C illustrate three filters stored in the filter data storing unit 505. The size of the three filters is 11×11. However, the filter coefficient corresponding to each pixel is different for each filter. The pixel corresponding to the center of the 11×11 rectangle is a target pixel. The value obtained by multiplying the pixel value of each pixel and the filter coefficient, and adding the products becomes the filtering result of the target pixel. Referring to FIGS. 6A, 6B, and 6C, the blur caused by performing smoothing increases in the order of a filter 601, a filter 602, and a filter 603. The filter selection unit 504 sets the filter for each pixel according to the color tone information obtained from the color tone information obtaining unit 205.

The method for determining the filter to be used in performing multivalue conversion will be described below. FIGS. 7A, 7B, 7C, and 7D illustrate multivalue conversion using the smoothing filter. Referring to FIG. 7A, the original image is a solid image formed of pixels having the pixel value 17. For ease of description, the original image is assumed to be the data of 26 values from 0 to 25 (wherein 0 indicates black). If the AM screen which can be output from the offset printing apparatus converts the original image (i.e., performs halftone processing on the original image), the halftone dot image illustrated in FIG. 7B is obtained.

Referring to FIG. 7B, the halftone image expresses one dot (i.e., the halftone dot) in an area (i.e., the cell). In the example illustrated in FIG. 7B, the halftone point is formed for each of 5×5 area. The pixel value of the black pixel is 0 and the pixel value of the white pixel is 1 in the binary image data obtained by performing halftone processing. If the halftone dot image is then converted into the format having 26 values, the pixel value of the black pixel becomes 0 and the pixel value of the white pixel becomes 25. Further, if a 3×3 smoothing filter and a 5×5 smoothing filter are applied, the binary image data obtained by performing halftone processing becomes multivalued. The 3×3 smoothing filter and the 5×5 smoothing filter are also referred to as averaging filters of the smoothing filters. The respective filter coefficients are the same, and are set so that the sum of all filter coefficients becomes 1. All of the filter coefficients of the 3×3 smoothing filter is ⅑, and all of the filter coefficients of the 5×5 smoothing filter is 1/25. The degree of blurring is greater for the 5×5 smoothing filter as compared to the 3×3 smoothing filter.

FIG. 7C illustrates a filter processing result using the 3×3 smoothing filter, and FIG. 7D illustrates a filter processing result using the 5×5 smoothing filter. Referring to FIG. 7D, the degree of the blur is high in the filter processing result. In such a case, the color tone information of the original image expressed by the halftone dot image can be correctly obtained. However, the halftone dot shape disappears. On the other hand, referring to FIG. 7C, the degree of the blur is low in the filter processing result. In such a case, the color tone information is incorrect. However, the halftone dot shape remains. The offset printing apparatus and the image forming apparatus 105 which performs proofing are different in the image forming process and principle, the color materials, and the output characteristic. The color tone to be expressed by the image forming apparatus 105 which performs proofing can be calculated by recognizing the brightness (i.e., the pixel value) of the original image expressed by the halftone dots. If the printed product obtained by the offset printing apparatus outputting the halftone dot image data is to be faithfully reproduced, it is necessary for the image forming apparatus 105 to reproduce the halftone dot shape. However, if the smoothing filter in which the degree of the blur is high is used as illustrated in FIG. 7D, the information on the halftone dot shape cannot be obtained even if the color tone information is correctly obtained. To solve such a problem, according to the present exemplary embodiment, the smoothing filter having a different degree of blur is used for each pixel, so that multivalue conversion realizing both color reproduction and halftone dot shape reproduction is performed.

Figure 8A:
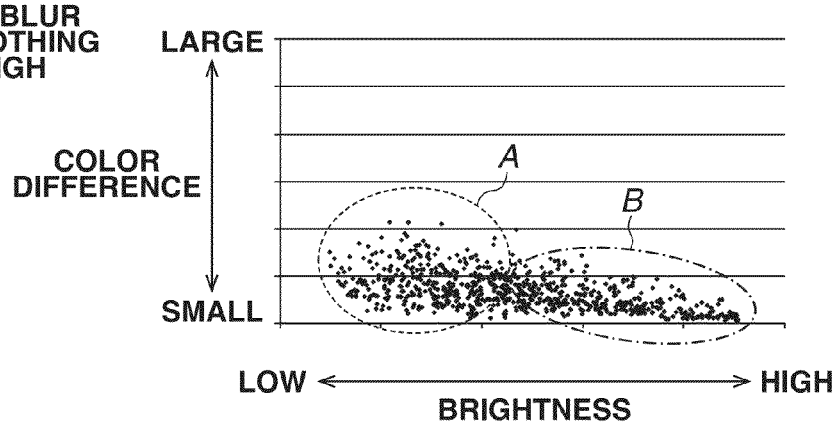
FIGS. 8A, 8B, and 8C illustrate processing results using each smoothing filter.
Figure 8B:
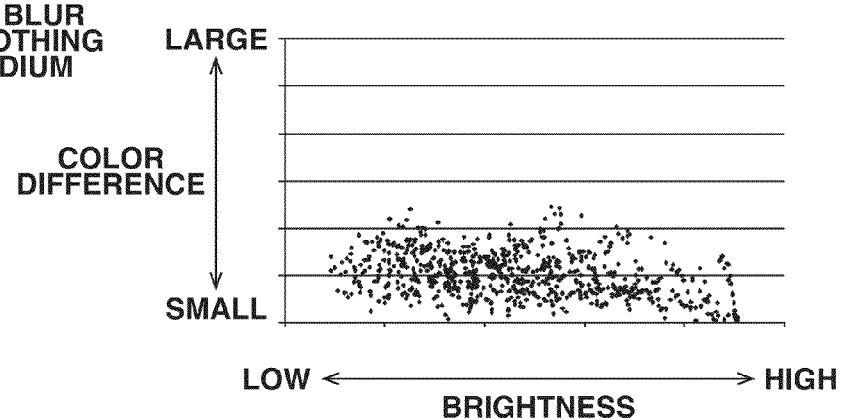
Figure 8C:
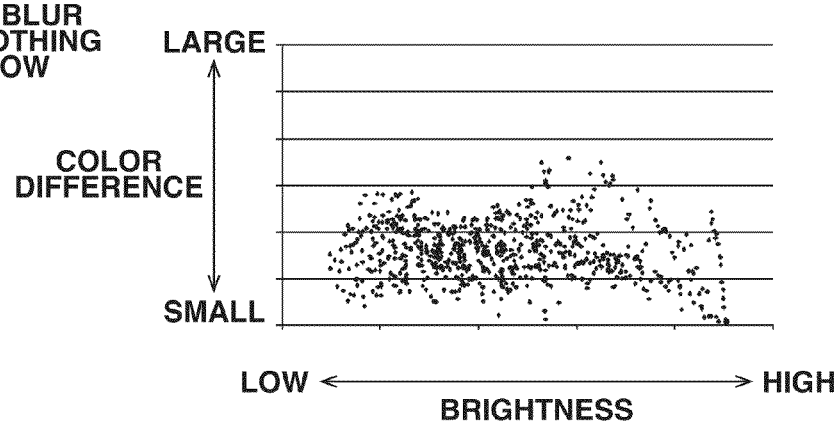

FIGS. 8A, 8B, and 8C illustrate filter processing results obtained using different smoothing filters. The horizontal axis indicates the lightness (luminosity) obtained when offset printing of a solid image formed of a single pixel value is performed. The horizontal axis indicates the difference between color appearances in the output from the offset printing apparatus and in the result of proofing performed by the inkjet image forming apparatus 105. More specifically, the output from the offset printing apparatus is color appearance measurement value of an area obtained by the offset printing apparatus outputting the halftone dot image data generated based on the original image data. Further, the result of proofing performed by the image forming apparatus 105 is the color appearance measurement value of an area obtained by the image processing apparatus 201 performing multivalue conversion on the halftone dot image data using the smoothing filter and various processing, and the image forming apparatus 105 performing output. The difference between such output from the offset printing apparatus and result of proofing performed by the image forming apparatus 105 is indicated as the color difference.

FIG. 8A illustrates the color difference obtained as a result of the image processing apparatus 201 performing multivalue conversion using a filter 603 illustrated in FIG. 6C. The degree of blur of the filter 603 is high. FIG. 8B illustrates the color difference obtained as a result of the image processing apparatus 201 performing multivalue conversion using a filter 602 illustrated in FIG. 6B. The degree of blur of the filter 602 is medium. FIG. 8C illustrates the color difference obtained as a result of the image processing apparatus 201 performing multivalue conversion using a filter 601 illustrated in FIG. 6A. The degree of blur of the filter 601 is low. Referring to FIGS. 8A, 8B, and 8C, the color reproducibility by the image forming apparatus 105 becomes lower as the color difference increases. The color difference is noticeably different according to the smoothing filter in the area of higher brightness indicated by a circle B. The color difference is smaller in the result obtained using the smoothing filter of a higher degree of blur. Further, the color reproducibility is reduced using the smoothing filter of a lower degree of blur. On the other hand, the color difference varies regardless of the smoothing filter in a dark area indicated by a circle A. In other words, there is little change in the color reproducibility in the dark area regardless of whether the smoothing filter of a high degree of blur or a low degree of blur is used.

According to the present exemplary embodiment, the color reproducibility is thus prioritized in the bright area in which the color reproducibility is greatly reduced due to the degree of smoothing of the filter. Multivalue conversion is thus performed using the smoothing filter of a high degree of blur in the bright area. In contrast, the reproduction of the halftone dot shape is prioritized in the dark area in which there is little change in the color reproducibility due to the degree of smoothing of the filter. Multivalue conversion is thus performed using the smoothing filter of a low degree of blur in the dark area. By performing multivalue conversion using the filter having a degree of smoothing according to the brightness as described above, both the color reproducibility and the halftone dot shape reproducibility are realized.

Figure 9:
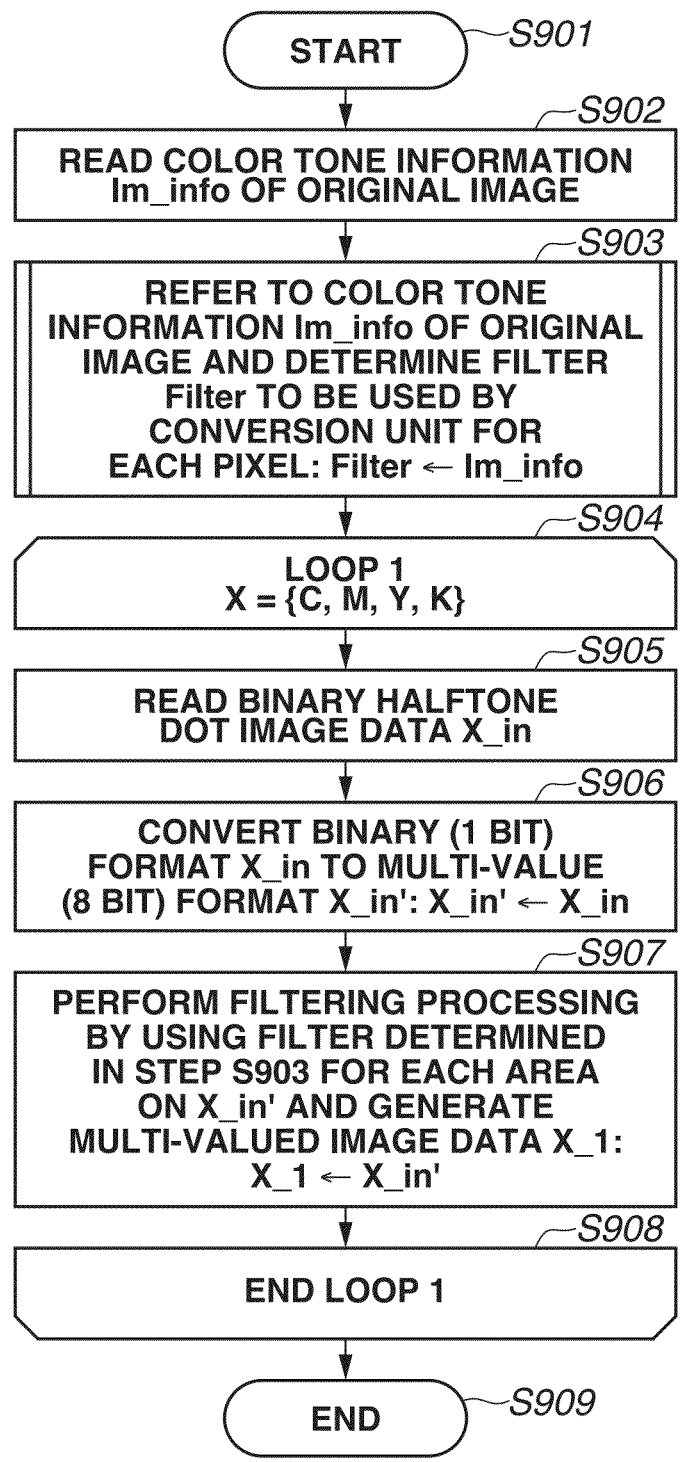
FIG. 9 is a flowchart illustrating multivalue conversion performed in the conversion unit.

FIG. 9 is a flowchart illustrating the multivalue conversion performed by the conversion unit 206.

In step S902, the conversion unit 206 reads the color tone information (lm_info (x, y)) from the color tone information obtaining unit 205. The color tone information is stored for each pixel, and (x, y) indicates a corresponding pixel position. According to the present exemplary embodiment, each pixel value (mean value of all color channels) in the original image data is used as the color tone information, so that the brightness is lowered as the pixel value decreases. More specifically, since the original image data is the digital image data having pixel values of 0 to 255, the brightness is lower as nearer to 0 and higher as nearer to 255.

Figure 10:
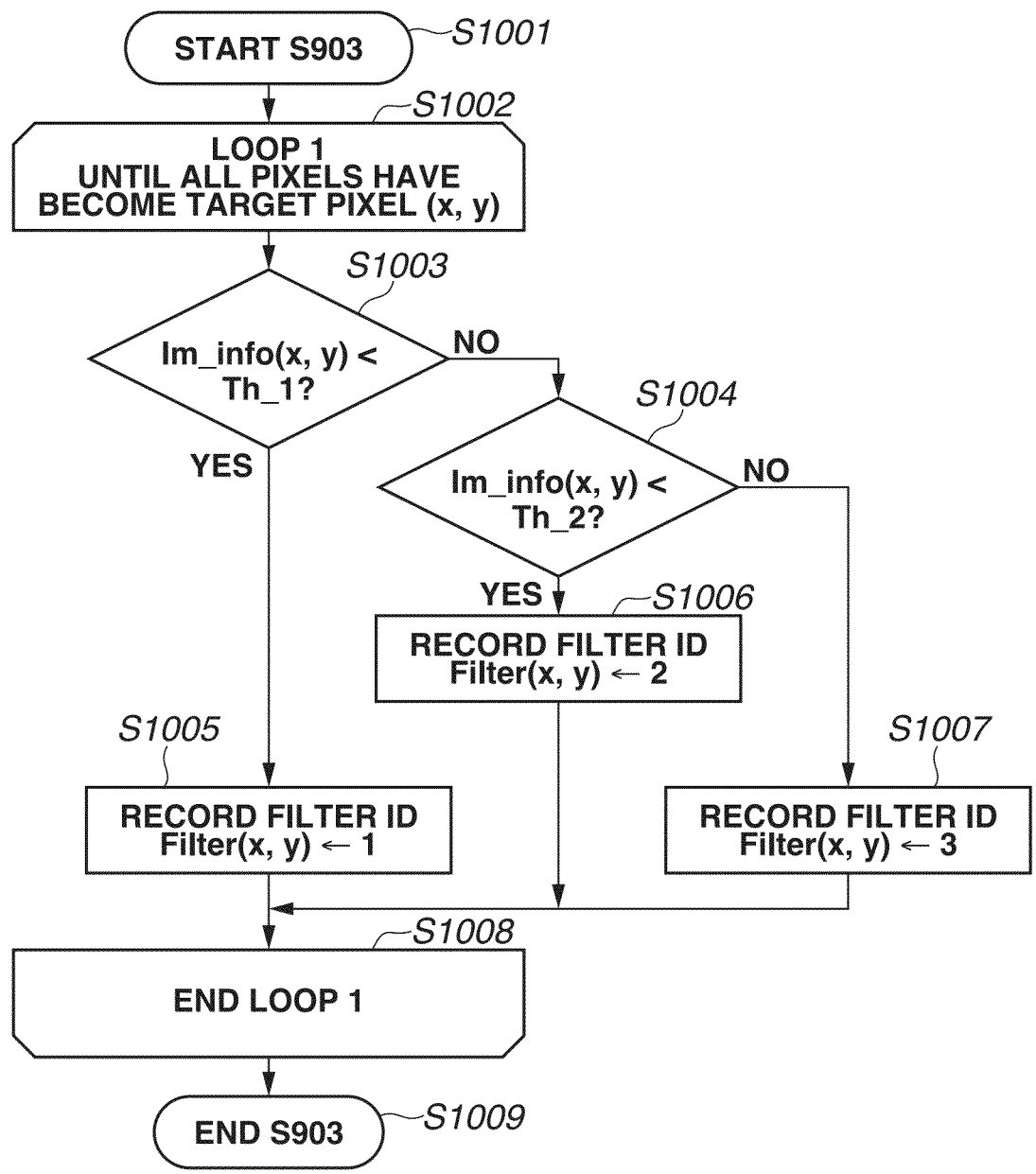
FIG. 10 is a flowchart illustrating a filter determination process.

In step S903, the filter selection unit 504 selects the smoothing filter to be used by the filter processing unit 503 according to the color tone information. FIG. 10 is a flowchart illustrating the process of step S903 in detail. As described above, according to the present exemplary embodiment, the filter data storing unit 505 stores three filters. It is assumed that the filters 601, 602, and 603 illustrated in FIGS. 6A, 6B, and 6C are respectively assigned filter identification (ID) 1, 2, and 3. In step S1003, the filter selection unit 504 compares the color tone information (lm_info (x, y)) with a predetermined threshold value Th_1. According to the present exemplary embodiment, the threshold value Th_1 is 75. If the color tone information (lm_info (x, y)) is smaller than the threshold value Th_1 (YES in step S1003), the process proceeds to step S1005. In step S1005, the filter selection unit 504 stores 1 as the filter ID in Filter (x, y). In other words, the filter selection unit 504 sets the smoothing filter of a low degree of blur to be used with respect to the pixel which is darker than the threshold value Th_1. If the color tone information (lm_info (x, y)) is greater than or equal to the threshold value Th_1 (NO in step S1003), the process proceeds to step S1004.

In step S1004, the filter selection unit 504 compares the color tone information (lm_info (x, y)) with a predetermined threshold value Th_2. The threshold value Th_2 is a value greater than the threshold value Th_1. According to the present exemplary embodiment, the threshold value Th_2 is 125. If the color tone information (lm_info (x, y)) is smaller than the threshold value Th_2 (YES in step S1004), the process proceeds to step S1006. In step S1006, the filter selection unit 504 stores 2 as the filter ID in Filter (x, y). If the color tone information (lm_info (x, y)) is greater than or equal to the threshold value Th_1 (NO in step S1004), the process proceeds to step S1007. In step S1007, the filter selection unit 504 stores 3 as the filter ID in Filter (x, y). In other words, the filter selection unit 504 sets the smoothing filter of a high degree of blur so as to be used with respect to the bright pixel which is greater than or equal to the threshold value Th_2. In step S1008, the above-described processes end and they are repeated with respect to all pixels, so that Filter (x, y) is set to all of the pixels in the halftone dot image data.

The processes of step S904 to step S908 illustrated in FIG. 9 are performed with respect to the halftone dot image data corresponding to each color. The halftone dot image data of cyan C will be described below as an example. A similar process may be performed with respect to the halftone dot image data corresponding to the other colors, each beginning with step S904 and ending with step S908.

In step S905, the conversion unit 206 reads halftone dot image data C_in of cyan from the input image buffer 204. In step S906, the image format conversion unit 502 converts the halftone dot image data C_in of the 1-bit (binary) format to multi-valued data C_in' of the 8-bit (0 to 255) format. More specifically, the image format conversion unit 502 multiplies the pixel value of each pixel in the halftone dot image data by 255.

In step S907, the filter processing unit 503 performs smoothing by using the smoothing filter with respect to the multi-valued data C_in', and performs multivalue conversion. More specifically, the filter processing unit 503 selects the filter corresponding to the filter ID from the filter data storing unit 505, based on Filter (x, y) stored in the target pixel in the multi-valued data C_in'. The filter processing unit 503 then refers to the target pixel and an adjacent pixel group, and performs a convolution operation between the pixel value and the filter coefficient. The filter processing unit 503 thus outputs multi-valued image data C_1. The multi-valued image data C_1 is the data formed of the pixel values from 0 to 255. The above-described processes are repeatedly performed with respect to the M, Y, and K halftone dot image data, so that multi-valued image data (C_1, M_1, Y_1, K_1) corresponding to each color is generated. In step S908, the processes of step S904 to step S908 end and then they are repeated for the other colors.

As described above, according to the present exemplary embodiment, in order to generate the image data to be output by the inkjet image forming apparatus that performs proofing on the halftone dot image data, the smoothing filter according to the brightness of the pixel is set with respect to the halftone dot image data, and multivalue conversion is performed. The filter of a high degree of blur is used with respect to the bright pixel to prioritize color reproducibility. The filter of a low degree of blur is used with respect to the dark pixel to prioritize reproduction of the halftone dot shape. As a result, both the color reproducibility and the reproducibility of the halftone dot shape can be realized.

The moiré appearing in a printed product output from the offset printing apparatus is more easily perceptible when the moiré is of comparatively low brightness. In particular, the moiré which is generated between colors such as a rosette pattern is generated due to overlapping of the halftone dots of each color having periodicity. The darker color tone is thus more easily perceptible. According to the present exemplary embodiment, if the brightness is low, the reproduction of the halftone dot shape is prioritized. The reproducibility of the moiré between colors such as the rosette pattern which is more noticeable in the dark color tone thus becomes high.

According to the present exemplary embodiment, the filter data storing unit 505 stores three smoothing filters of different degrees of blur. However, the filter data storing unit 505 may store any number of smoothing filters as long as there are two or more filters. Further, the area in which the filter coefficient is 0 in the filters illustrated in FIGS. 6A, 6B, and 6C may be omitted, so that the filter size is reduced.

Figure 11:
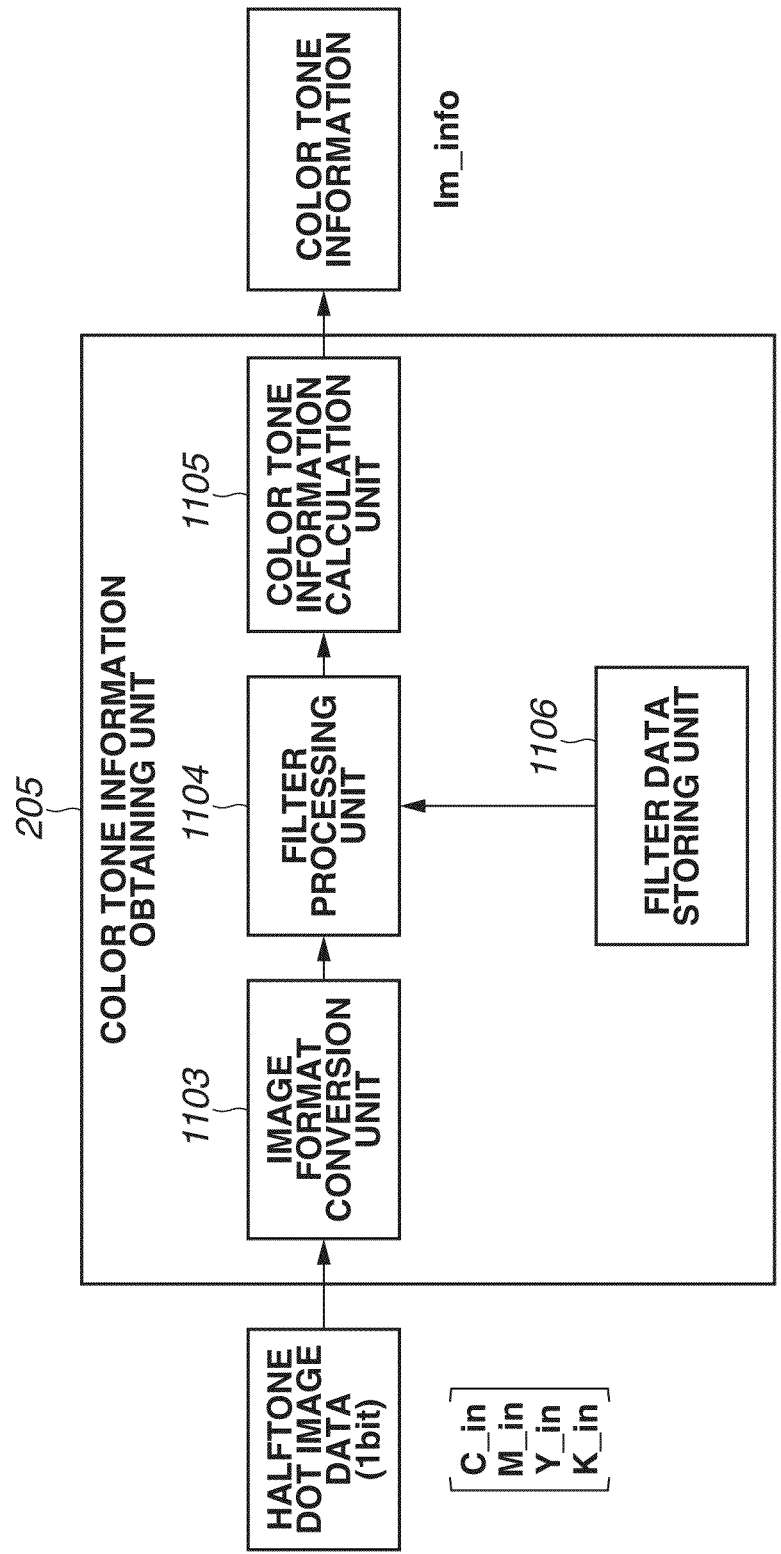
FIG. 11 illustrates a detailed logical configuration of a color tone information obtaining unit.

According to the first exemplary embodiment, the color tone information obtaining unit is capable of referring to the original image data. The color tone information obtaining unit thus refers to the pixel value (i.e., the brightness) of the original image data as the color tone information corresponding to the halftone dot image data. According to a second exemplary embodiment of the present disclosure, the method for calculating, when the color tone information obtaining unit is not capable of referring to the original image data, the color tone information from the halftone dot image data will be described below. The configurations and the processes similar to those according to the first exemplary embodiment are assigned the same reference numbers, and detailed description thereof will be omitted. FIG. 11 is a block diagram illustrating a detailed logical configuration of the color tone information obtaining unit 205 according to the second exemplary embodiment. Referring to FIG. 11, the color tone information obtaining unit 205 includes an image format conversion unit 1103, a filter processing unit 1104, a filter data storing unit 1106, and a color tone information calculation unit 1105. The binary halftone dot image data (C_in, M_in, Y_in, K_in) stored in the input image buffer 104 is input to the color tone information calculation unit 1105. The color tone information calculation unit 1105 thus outputs the color tone information (lm_info).

Figure 12:
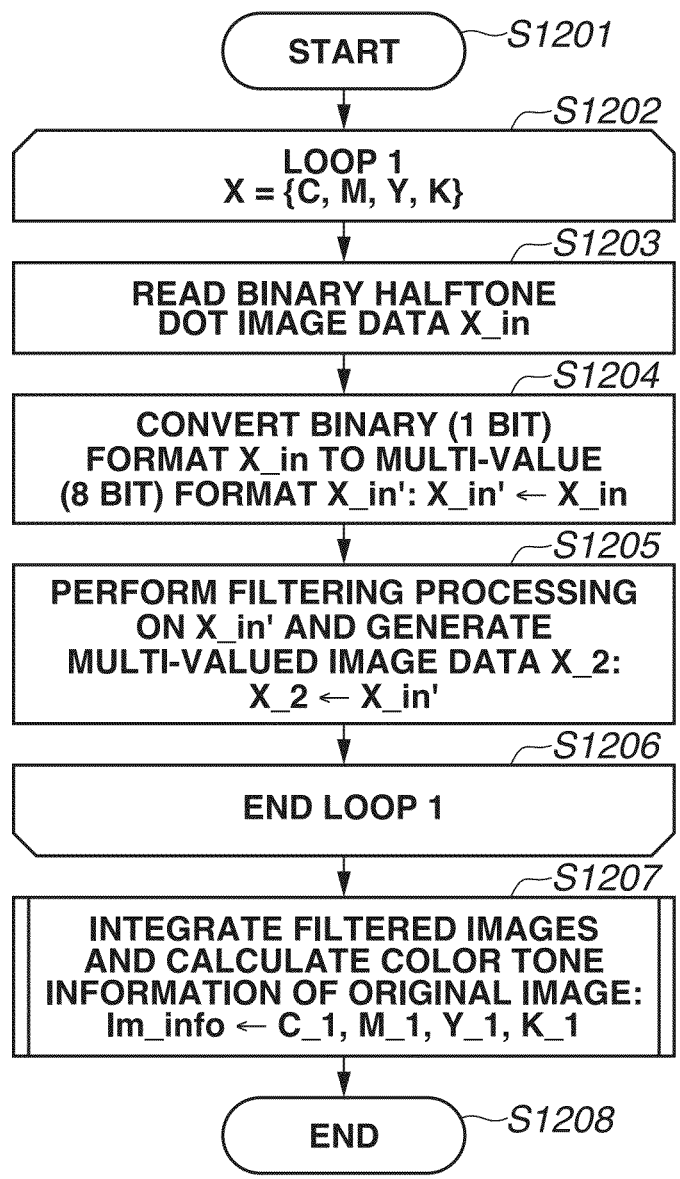
FIG. 12 is a flowchart illustrating a color tone information obtaining process.

FIG. 12 is a flowchart illustrating a process performed by the color tone information obtaining unit 205. The processes to be described below of step S1202 to step S1206 illustrated in FIG. 12 are performed for each of the halftone dot image data corresponding to the color components. According to the present exemplary embodiment, the halftone dot image data of cyan C will be described below as an example. In step S1203, the color tone information obtaining unit 205 reads the halftone dot image data C_in stored in the input image buffer 204.

In step S1204, the image format conversion unit 1103 converts the halftone dot image data C_in of the 1-bit (binary) format to multi-valued data C_in' of the 8-bit format. The pixel of the pixel value 1 in the halftone dot image data C_in is converted to a pixel value 255 (indicating that the brightness is high), and the pixel of the pixel value 0 is converted to a pixel value 0 (indicating that the brightness is low). In step S1205, the filter processing unit 1104 performs smoothing with respect to the multi-valued data C_in' using the smoothing filter stored in the filter data storing unit 1106. FIG. 13A illustrates an example of a filter stored in the filter data storing unit 1106. According to the present exemplary embodiment, a gauss filter as illustrated in FIG. 13A is used. The smoothing filter to be used in step S1205 is set by considering the resolution of the image and the number of lines per inch of the halftone dots. The averaging filter illustrated in FIG. 13B may also be used. The multi-valued image data obtained by performing filter processing is indicated as C_2. In step S1206, the above-described processes end and they are similarly performed with respect to the M, Y, and K halftone dot image data, so that multi-valued image data C_2, M_2, Y_2, and K_2 is generated.

In step S1207, the color information calculation unit 1105 calculates the color tone information of each pixel value based on the multi-valued image data C_2, M_2, Y_2, and K_2 corresponding to each color. FIG. 14 is a flowchart illustrating in detail the color tone information calculation process from step S1402 to step S1405 performed in step S1207. In step S1403, the color information calculation unit 1105 reads the pixel value of the target pixel (x, y) in the multi-valued image data C_2, M_2, Y_2, and K_2. The respective pixel values are indicated as C_2 (x, y) and M_2 (x, y). In step S1404, the color information calculation unit 1105 calculates luminosity L (x, y) of the target pixel (x, y) in the original image data to be expressed by the halftone dot image data from C_2 (x, y), M_2 (x, y), Y_2 (x, y) and K_2 (x, y). The color information calculation unit 1105 uses an LUT for calculating the luminosity L. The color tone becomes darker as the value of the luminosity L (x, y) decreases. In step S1405, the above-described processes end and they are repeatedly performed for all pixels in the halftone dot image data, and the luminosity L (x, y) of each pixel is calculated as the color tone information lm_info.

The color tone information obtaining process according to the present exemplary embodiment thus ends. According to the present exemplary embodiment, the color tone information which is to be expressed in a pseudo manner by the halftone image data can be calculated based on the halftone dot image data.

According to the exemplary embodiments above, the color tone information of the target pixel is calculated by integrating all channels' pixel values of the halftone dot image data corresponding to C, M, Y, and K. However, the color tone information of each color may be independently stored. In such a case, the process performed in step S1403 becomes as follows.

$$LC(x,y) \leftarrow C\_1(x,y)$$

$$LM(x,y) \leftarrow M\_1(x,y)$$

$$LY(x,y) \leftarrow Y\_1(x,y)$$

$$LK(x,y) \leftarrow K\_1(x,y)$$

The filter is selected for each color based on the above-described color tone information of each color.

Further, the color tone information according to the first and second exemplary embodiments are not characteristic of whether the document image data can be referred to. In other words, according to the first exemplary embodiment, the luminosity may be obtained from the pixel value of the original image data and be set as the color tone information. Further, according to the second exemplary embodiment, the average pixel value of the multi-valued image data (C_2, M_2, Y_2, and K_2) may be employed as the color tone information.

Figure 15:
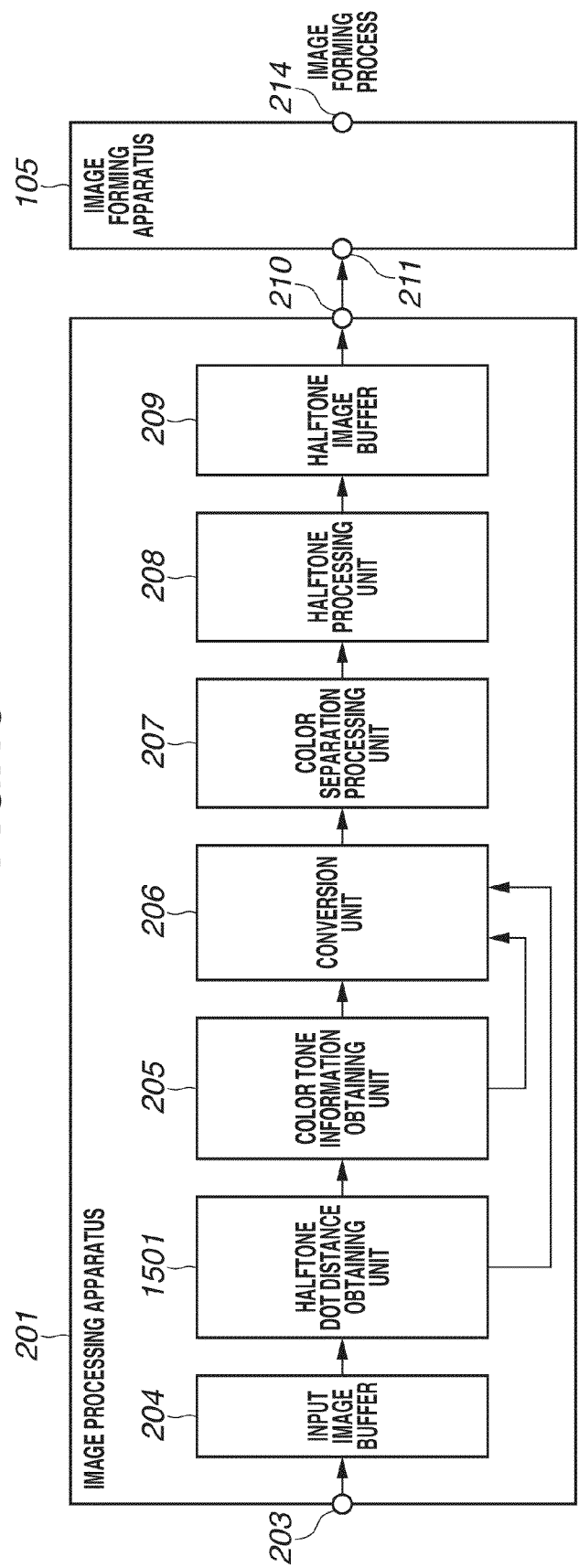
FIG. 15 is a block diagram illustrating a configuration of the image processing apparatus.

According to a third exemplary embodiment, the method for setting the filter to be employed in performing multivalue conversion using a halftone dot distance of the halftone dot image data will be described below. The configurations and the processes similar to those according to the first exemplary embodiment are assigned the same reference numbers, and detailed description thereof will be omitted. FIG. 15 is a block diagram illustrating a configuration of the image processing apparatus according to the third exemplary embodiment. According to the third exemplary embodiment, the CPU 101 causes a halftone dot distance obtaining unit 1501 to obtain the halftone dot distance of the halftone dot image data. The halftone dot distance is the distance between the nearest-neighboring halftone dots.

As described above, it is desirable to determine the smoothing filter to be used by the conversion unit 206 according to the number of lines per inch of the halftone dots. The filter corresponding to the number of lines per inch of the halftone dots can thus be set by obtaining the halftone dot distance. If the averaging filter of the same width as the halftone dot distance is employed, the pixel value of the original image data can be reproduced. Further, if the averaging filter of a smaller size as compared to the halftone dot distance is employed, the halftone dot shape remains. The filter data storing unit 505 in the conversion unit 206 thus generates the smoothing filter according to the input halftone dot distance of the halftone dot image data, and stores the generated smoothing filter. For example, in step S903 illustrated in FIG. 9, the filter data storing unit 505 generates an averaging filter of the same width as the halftone dot distance and an averaging filter of a smaller width as compared to the halftone dot distance. As a result, when multivalue conversion is to be performed by prioritizing color reproduction, the filter selection unit 504 sets the averaging filter of the same width as the halftone dot distance. Further, when multivalue conversion is to be performed by prioritizing halftone dot shape reproduction, the filter selection unit 504 sets the averaging filter of a smaller width as compared to the halftone dot distance.

According to the third exemplary embodiment, multivalue conversion can be performed using a more suitable filter. Further, the third exemplary embodiment is applicable to the input halftone dot image data of any number of lines per inch.

According to the first exemplary embodiment, the pixel value of the pixel in the original image data is used as the color tone information. The pixel value of the pixel in the original image data indicates the brightness of the color such as cyan. According to a fourth exemplary embodiment of the present disclosure, hue is used as the color tone information instead of the brightness as will be described below. The configurations and the processes similar to those according to the first exemplary embodiment are assigned the same reference numbers, and detailed description thereof will be omitted.

The color appearance is not necessarily uniform for all hues to a human eye. The difference in color (i.e., color difference) is easily perceptible with respect to a type of hue, and the color difference is not easily recognizable by the human eye with respect to other type of hue. In such a case, it is desirable to prioritize color reproduction of the proof in the area in which the color difference is easily perceptible. On the other hand, if the color difference with respect to the hue is not easily recognizable by the human eye, color difference is not easily perceptible even when the color reproducibility becomes lowered. In such a case, it is desirable to prioritize the reproducibility of the halftone dot shape. According to the fourth exemplary embodiment, the filter selection unit 504 stores a table for applying the smoothing filters as follows. The smoothing filter of a high degree of blur is associated with the hue in which the color difference is easily perceptible, and the filter of a low degree of blur is associated with the hue in which the color difference is not easily perceptible.

As a result, the color reproducibility and the halftone dot shape reproducibility can both be obtained. The filter may also be set by considering both the hue and the brightness. Further, the smoothing filter for performing multivalue conversion may be switched by employing a direction of a change in the hue or chroma as the color tone information. Furthermore, an evaluation function in which the hue, the brightness, and the chroma are appropriately weighted and combined may be employed.

According to the above-described exemplary embodiments, the color reproducibility and the halftone dot shape reproducibility are considered in performing proofing of the offset printing apparatus. Further, one of the color reproducibility and the halftone dot shape reproducibility may be emphasized to improve the reproducibility thereof. According to a fifth exemplary embodiment of the present disclosure, a case where there is a color reproduction mode which further emphasizes the color reproducibility and a halftone dot shape reproduction mode which further emphasizes the halftone dot shape reproducibility will be described as an example. The configurations and the processes similar to those according to the first exemplary embodiment are assigned the same reference numbers, and detailed description thereof will be omitted.

Figure 17:
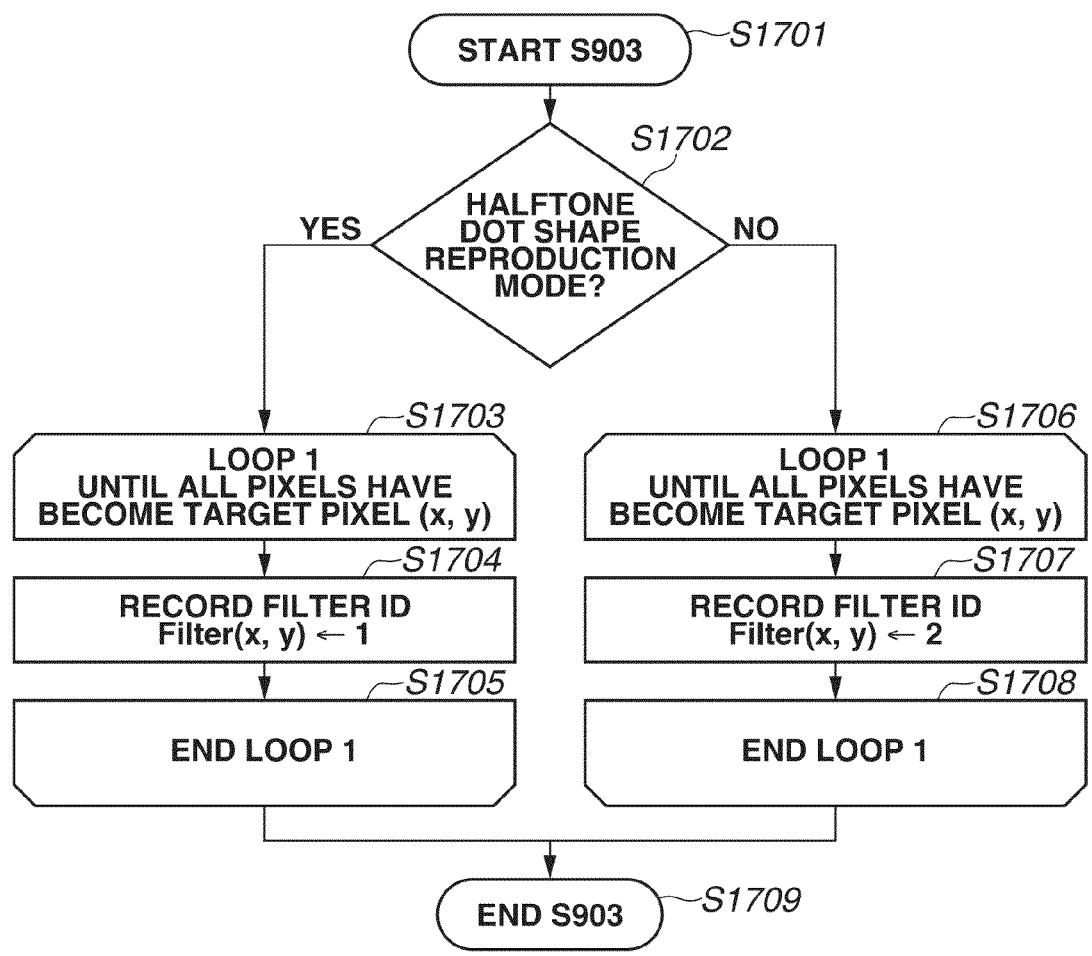
FIG. 17 is a flowchart illustrating the filter determination process.

FIG. 17 is a flowchart illustrating the process of step S903 of the flowchart illustrated in FIG. 9 according to the present exemplary embodiment. The user designates whether to set the mode to the color reproduction mode or the halftone dot shape reproduction mode via a UI of the image processing apparatus. The color reproduction mode or the halftone dot shape reproduction mode is thus set. The degree of blur of the filter corresponding to the filter ID 2 is higher than that of the filter corresponding to the filter ID 1. In step S1702, if it is determined that the mode is the halftone dot shape reproduction mode (YES in step S1702), the filter 1 is used by the processes of steps S1703 to S1705. If it is determined that the mode is the color reproduction mode (NO in step S1702), the filter 2 is used by the processes of steps S1706 to S1708. As described in the third exemplary embodiment, the smoothing (or the averaging) filter based on the halftone dot distance may be used as the filter 2. Multivalue conversion is thus performed using the filter determined as described above. As a result, two types of printing employing the color reproduction mode and the halftone dot shape reproduction mode are performed with respect to the same halftone dot image data. The user refers to the two images, so that proofing of higher color reproducibility and halftone dot shape reproducibility can be performed.

Figure 18:
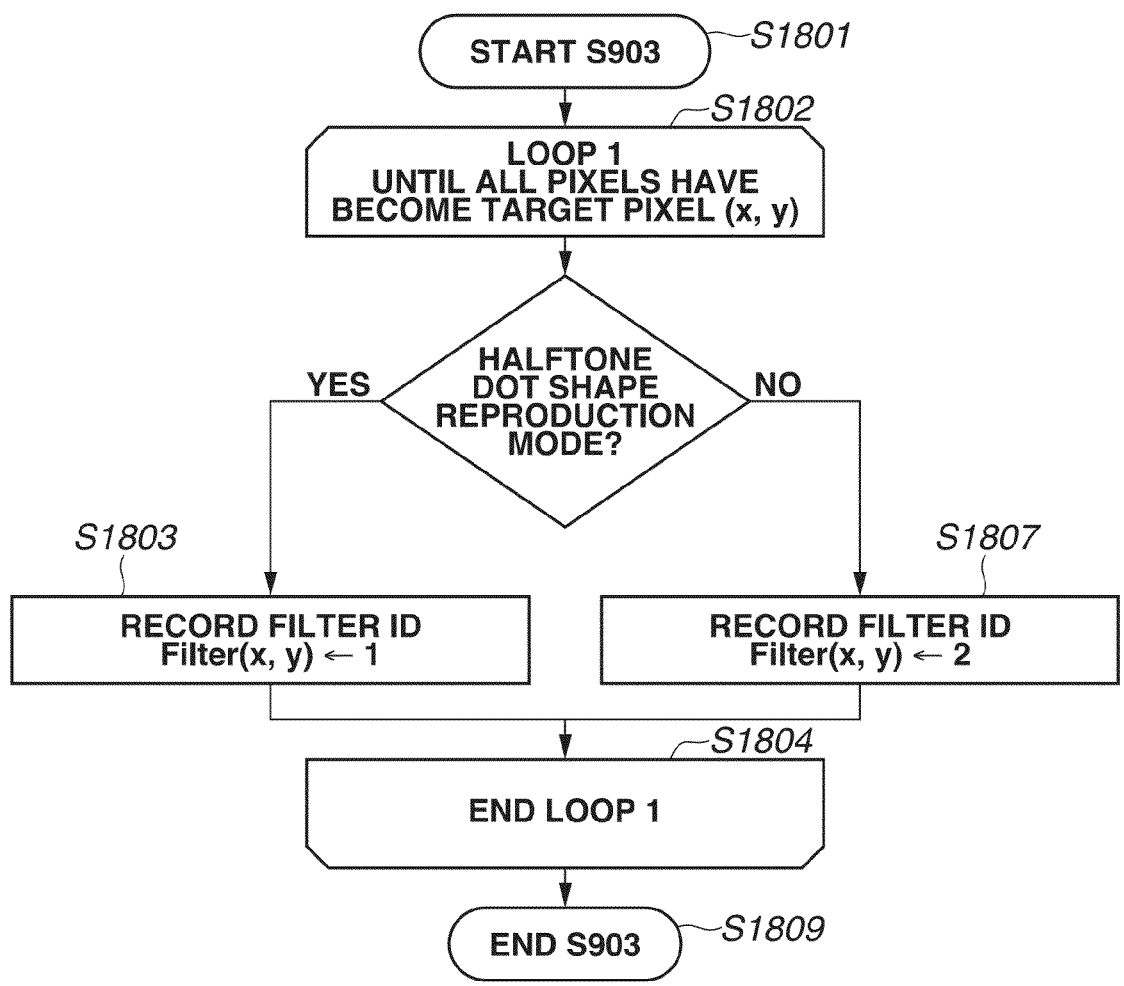
FIG. 18 is a flowchart illustrating a filter determination process.

A modification example of the present exemplary embodiment will be described below. If the original image can be referred to, color separation may be performed in the color reproduction mode by viewing the original image data as the multi-valued data (C_1, M_1, Y_1, K_1). Further, according to the above-described exemplary embodiments, the same mode is set to the entire image. However, the mode may be changed according to the area of the image. FIG. 18 is a flowchart illustrating the process performed in such a case. The method for setting the mode may be as follows. An image is displayed on the UI of the image processing apparatus. The user views the displayed image and selects the area to be performed processing which is different from other area via an input operation using a mouse.

Figure 19:
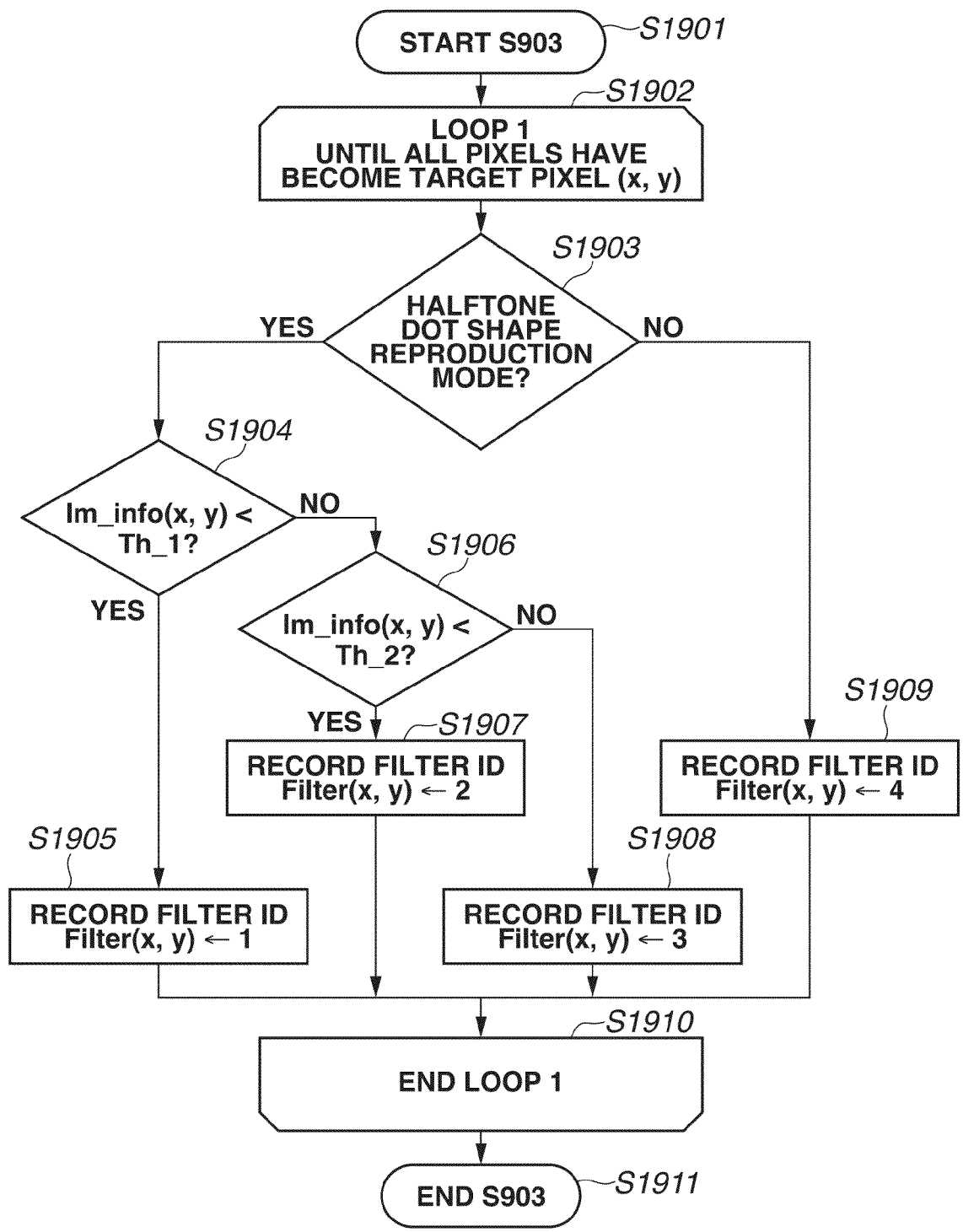
FIG. 19 is a flowchart illustrating a filter determination process.

Further, the elements according to the first and second exemplary embodiments may be added to the present exemplary embodiment. FIG. 19 is a flowchart illustrating an example of such a process in which the filter is selected by considering the color tone information in the halftone dot reproduction mode. The relation between the filters with respect to the degree of blur is as follows: filter 1<filter 2<filter 3≤filter 4. According to such an example, the color reproduction can also be realized in the halftone dot reproduction mode. Furthermore, the above-described exemplary embodiment is applicable by providing the halftone dot shape reproduction mode, a color reproduction priority mode, and a default mode in which neither of the halftone dot shape reproduction mode and the color reproduction priority mode is set. FIG. 20 is a flowchart illustrating an example of such a process (wherein the relation between the filters with respect to the degree of blur is as follows: filter 1≤filter 2<filter 3<filter 4≤filter 5).

Moreover, as described above, the color reproducibility is low in the area of low brightness. To solve such a problem, if the halftone dot shape reproduction mode is set, multivalue conversion is performed using the smoothing filter of a low degree of blur, similarly as in the process of the flowchart illustrated in FIG. 20. On the other hand, if the color reproduction mode is set, the smoothing filter used in performing multivalue conversion may be appropriately set for each pixel. More specifically, multivalue conversion is performed using the smoothing filter of a comparatively low degree of blur in the area of low brightness in which color reproduction is difficult, even if the user has designated the color reproducibility priority mode. As a result, multivalue conversion is performed by prioritizing color reproducibility according to the user instruction for the pixel having the brightness appropriate for color reproduction. Further, multivalue conversion is performed to reproduce the halftone dot shape in the area of the brightness in which color reproduction is difficult. It thus prevents multivalue conversion in which both the color reproducibility and halftone dot shape reproducibility are low to be performed even when the mode is the color reproduction mode.

According to the above-described exemplary embodiments, the smoothing filter corresponding to the color tone is set for each pixel. However, the filter may be set for each area including a plurality of pixels. In such a case, a cell including one halftone dot may be set as an area. The average value of the color tone is calculated for each cell, and the filter is set according to the average value of the color tone. The halftone dot image data expresses in a pseudo manner the color tone by the size of the halftone dot in cell unit. It can thus be viewed that the pixels included in the cell basically expresses the same color tone in the halftone dot image data, so that a processing load can be reduced by setting the filter for each cell.

Furthermore, according to the above-described exemplary embodiments, multivalue conversion is performed by executing filtering by using the smoothing filter. However, the same result can be obtained by applying a frequency filter employing Fourier transformation instead of performing convolution calculation using the smoothing filter. Moreover, filter processing may employ a center value, a maximum value, or a minimum value of the pixel value, may count on and off of the dots, or may include a logical operation such as a logical OR or a logical AND operation. Further, the filter processing may include a non-linear operation by considering dot gain, or may perform a different process in a center portion and a peripheral portion. The filter by which a preferable result can be obtained may be selected by considering conditions for implementation including color reproducibility and halftone dot reproducibility for the shape and the processes of the filter.

Furthermore, according to the above-described exemplary embodiments, in step S903 illustrated in FIG. 9, the filter selection unit 504 compares the color tone information and the predetermined threshold value. The filter selection unit 504 thus determines the filter to be selected. However, it is not limited thereto. The table in which the color tone information is associated with the filter ID may be stored, and the filter may be selected by referring to the table. Moreover, according to the above-described exemplary embodiments, the filter data storing unit 505 stores the filter in which the filter size and the filter coefficient are predetermined. However, multivalue conversion may be more suitably performed as follows.

The value of the color tone information lm_info (x, y) is used as a parameter. Filter data which continuously changes with respect to the change in the parameter is dynamically generated and used. More specifically, a gauss filter G may be used as the smoothing filter to be employed by the conversion unit 206. In such a case, in step S907 of the flowchart illustrated in FIG. 9, the filter processing unit 603 performs filter processing as follows. The filter processing unit 603 calculates the filter processing result by multiplying a weight G(r)

indicated by equation 1 to the pixel value of a pixel at a distance r from the target pixel (x, y).

$$G(r) = \frac{1}{\sqrt{2\pi}\,\sigma} \exp\left(-\frac{r^2}{2\sigma^2}\right) \qquad 1$$

In step S903, the filter selection unit 504 thus determines the value of σ for calculating G(x) as σ=k×lm_info (x, y) (wherein k is a proportional constant). As a result, the degree of smoothing can be continuously changed with respect to the value of the color tone information lm_info (x, y). If the color tone information lm_info (x, y) is the luminosity L (x, y), σ increases as the brightness increases, i.e., the filter functions as a filter of a high degree of smoothing. The method for determining the parameter is not limited thereto, and an arbitrary function may be employed.

Moreover, according to the above-described exemplary embodiments, continuous filter data is generated with respect to the color tone information. The continuous filter data may be similarly generated with respect to a user intention in performing proofing which is indicated by the modes according to the fifth exemplary embodiment. In other words, the weight to be applied to the color reproduction or the halftone dot shape reproduction by the user is reflected in σ. According to the fifth exemplary embodiment, the user designates either of the two states, i.e., the color reproduction mode or the halftone dot shape reproduction mode. Instead of designating such modes, the user inputs the weight to be applied to color reproduction as a numerical value or a position of a slider bar. For example, if σ=k×(a weight desired by the user to be applied to color reproduction) (wherein k is a proportional constant), the blur caused by the filter increases as the weight desired by the user to be applied to color reproduction increases. Color reproduction can thus be prioritized. In such a case, an upper limit value and a lower limit value are set to σ so that printing performed in proofing does not fail. As a result, proofing can be performed by flexibly responding to the user intention.

Figure 16:
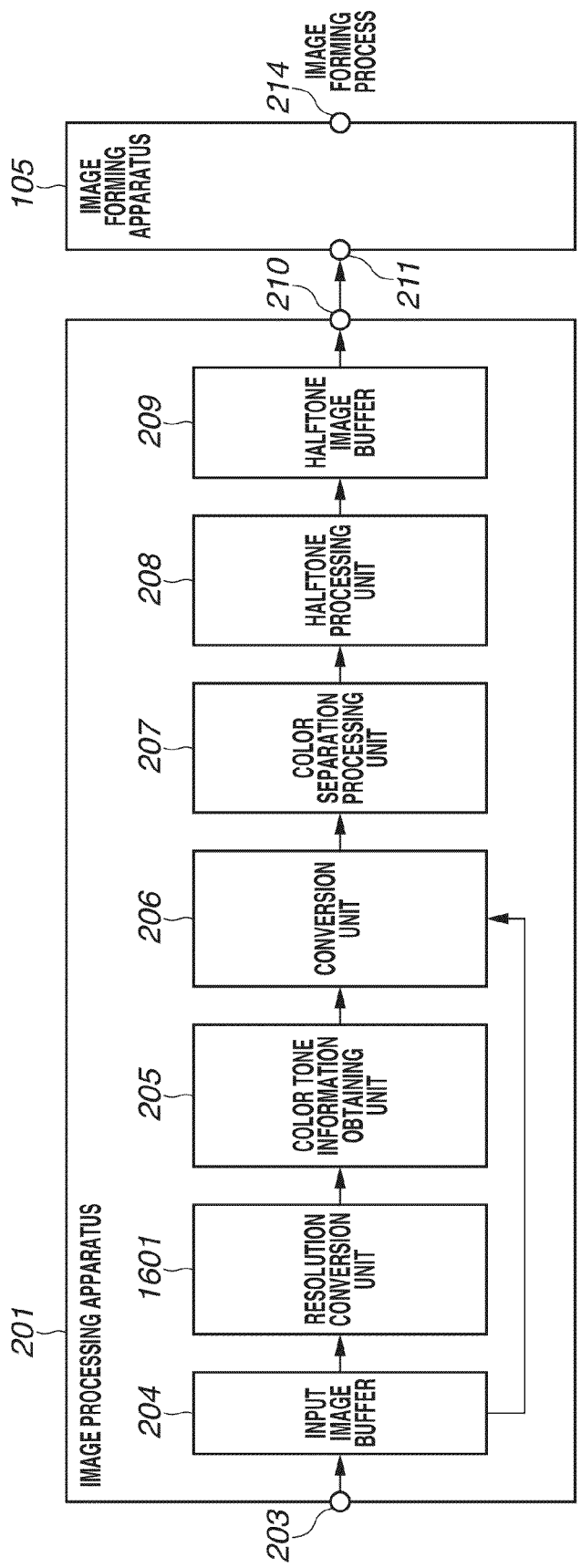
FIG. 16 is a block diagram illustrating a configuration of the image processing apparatus.

According to the above-described exemplary embodiments, it is assumed that the images from the halftone dot image data to the halftone image data are images of the same resolution. However, the resolutions are not necessarily the same. If the resolution which can be output by the offset printing apparatus and the resolution which can be output by the inkjet image forming apparatus for performing proofing are different, a resolution conversion process may be included as necessary. For example, the image processing apparatus 201 illustrated in FIG. 16 includes a resolution conversion unit 1601 prior to inputting the halftone dot image data to the color tone information obtaining unit 205. The resolution conversion unit 1601 thus performs resolution conversion on the halftone dot image data stored in the input image buffer 204 before the color tone information obtaining unit 205 obtains the color tone information. After the resolution conversion unit 1601 converts the halftone dot image data to the desired resolution, image processing of step S402 and the following steps may then be performed. Further, resolution conversion can be performed to reduce the processing load.

Furthermore, according to the above-described exemplary embodiments, 0 indicates the on dot and 1 indicates the off dot in the halftone image data. However, it is not limited thereto. Halftone processing may be performed so that the pixel value 0 is the off dot and the pixel value 1 is the on dot in the halftone image data. In such a case, the values indicating the brightness become reversed from the original image data in which the brightness becomes lower as the pixel value becomes smaller.

Moreover, according to the above-described exemplary embodiments, the image processing apparatus 201 and the image forming apparatus 105 which performs proofing are separate apparatuses. However, the image forming apparatus 105 may include the image processing apparatus 201.

Further, according to the above-described exemplary embodiments, the halftone dot image data is the binary data. However, the halftone dot image data may be ternary data. Furthermore, the offset printing apparatus is not limited to the C, M, Y, and K offset printing apparatus, and may print 2 colors or 3 colors, or print more than C, M, Y, and K, such as 6 colors and 8 colors. Moreover, according to the above-described exemplary embodiments, multivalue conversion using the filter according to the color tone information is performed on all of the C, M, Y, and K halftone dot image data. However, the present exemplary embodiment may also be applied to the halftone point image data corresponding to only one of the color components among C, M, Y, and K. For example, the halftone point shape of yellow is difficult to perceive. The filter may thus be fixed to only prioritize color reproduction with respect to the Y halftone dot image data. Further, the original image data is not limited to 8-bit data, and may be 16-bit data.

Furthermore, according to the above-described exemplary embodiments, the inkjet printer is described as an example of the image forming apparatus 105 which forms the image employing the dot recording method. However, it is not limited thereto, as long as the image forming apparatus expresses gradation by the number of dots.

Moreover, the image processing apparatus 201 according to the above-described exemplary embodiments may be realized by hardware. For example, there is a technique for converting programs which implements the flowcharts according to the exemplary embodiments as a logical circuit on a field-programmable gate array (FPGA). As a result, a hardware design capable of executing the flowcharts according to the above-described exemplary embodiments can be simply realized.

The present disclosure can be realized by providing a storage medium storing a program code of software which implements the functions of the above-described exemplary embodiments to a system or an apparatus. In such a case, a computer (or a CPU or a micro-processing unit (MPU)) in the system or the apparatus reads and executes the program code stored in the computer-readable storage medium, and realizes the functions of the above-described exemplary embodiments.

According to the present disclosure, the inkjet image forming apparatus is capable of performing image processing for outputting the halftone dot image with higher reproducibility.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-143698 filed Jul. 9, 2013, which is hereby incorporated by reference herein in its entirety.

What is claimed is:

1. An image processing apparatus configured to generate print data used for recording image data expressing halftone dots by an image forming apparatus, the image processing apparatus comprising:
    an input unit configured to input image data expressing halftone dots;
    an obtaining unit configured to obtain color tone information indicating color tone for each pixel or for each area including a plurality of pixels in the image data;
    a conversion unit configured to convert the image data into multi-valued image data based on a degree of smoothing according to the color tone information;
    a color separation processing unit configured to perform color separation on the multi-valued image data by the conversion unit; and
    a halftone processing unit configured to convert image data which has been color-separated by the color separation processing unit into print data.

2. The image processing apparatus according to claim 1, wherein the color tone information indicates lightness expressed by a pixel or an area including a plurality of pixels in the image data.

3. The image processing apparatus according to claim 2, wherein the conversion unit performs multivalue conversion of a higher degree of smoothing with respect to a pixel of which the lightness is high than a pixel of which the lightness is low.

4. The image processing apparatus according to claim 1, wherein the color tone information is information indicating hue expressed by a pixel or an area including a plurality of pixels in the image data.

5. The image processing apparatus according to claim 4, wherein the conversion unit performs multivalue conversion of a higher degree of smoothing with respect to the hue of which a color difference is easy to perceive by a human eye than the hue of which a color difference is difficult to perceive by a human eye.

6. The image processing apparatus according to claim 1, wherein the obtaining unit performs filtering processing by using a smoothing filter with respect to the image data to obtain the color information.

7. The image processing apparatus according to claim 1, wherein the conversion unit performs filtering processing by using the smoothing filter.

8. The image processing apparatus according to claim 7, wherein the conversion unit includes a plurality of smoothing filters of different degree of smoothing, and switches the smoothing filters according to the color tone information.

9. The image processing apparatus according to claim 1,
    wherein the image data is data converted to image data expressing halftone dots by performing halftone processing on original image data, and
    wherein the obtaining unit obtains the color tone information from the original image data.

10. The image processing apparatus according to claim 1, wherein the image forming apparatus is an inkjet printer.

11. The image processing apparatus according to claim 1, wherein the halftone processing unit performs halftone processing with respect to image data which has been color-separated by the color separation processing unit.

12. An image processing apparatus configured to generate print data used for recording image data expressing halftone dots by an image forming apparatus, the image processing apparatus comprising:
    an input unit configured to input image data expressing halftone dots;
    a setting unit configured to set one of a plurality of modes including a color reproduction mode and a halftone dot shape reproduction mode;
    a conversion unit configured to convert the image data into multi-valued image data based on a degree of smoothing according to the mode;
    a color separation processing unit configured to perform color separation on the multi-valued image data by the conversion unit; and
    a halftone processing unit configured to convert image data which has been color-separated by the color separation processing unit into print data.

13. The image processing apparatus according to claim 12, further comprising an obtaining unit configured to obtain color tone information indicating color tone for each pixel or for each area including a plurality of pixels,
    wherein the conversion unit performs multivalue conversion of the image data based on a degree of smoothing according to the mode and the color tone information.

14. A non-transitory storage medium storing a computer-executable program for causing a computer, by reading and executing the program, to function as an image processing apparatus configured to generate print data used for recording image data expressing halftone dots by an image forming apparatus, the image processing apparatus comprising:
    an input unit configured to input image data expressing halftone dots;
    an obtaining unit configured to obtain color tone information indicating color tone for each pixel or for each area including a plurality of pixels in the image data;
    a conversion unit configured to convert the image data into multi-valued image data based on a degree of smoothing according to the color tone information;
    a color separation processing unit configured to perform color separation on the multi-valued image data by the conversion unit; and
    a halftone processing unit configured to convert image data which has been color-separated by the color separation processing unit into print data.

15. A method for controlling an image processing apparatus configured to generate print data used for recording image data expressing halftone dots by an image forming apparatus, the method comprising:
    inputting image data expressing halftone dots;
    obtaining color tone information indicating color tone for each pixel or for each area including a plurality of pixels in the image data;
    outputting multi-valued image data which is the image data that has been subjected to multi-value processing based on a degree of smoothing according to the color tone information;
    color-separating the multi-valued image data; and
    converting the color-separated image data into print data.

16. A method for controlling an image processing apparatus configured to generate print data used for recording image data expressing halftone dots by an image forming apparatus, the method comprising:
    inputting image data expressing halftone dots;
    setting one of a plurality of modes including a color reproduction mode and a halftone dot shape reproduction mode;
    performing multivalue conversion on the image data based on a degree of smoothing according to the mode;
    color-separating the multi-valued image data; and
    converting the color-separated image data into print data.

* * * * *